United States Patent
Segal et al.

(10) Patent No.: US 9,032,298 B2
(45) Date of Patent: May 12, 2015

(54) WEBSITE APPLICATION SYSTEM FOR ONLINE VIDEO PRODUCERS AND ADVERTISERS

(75) Inventors: Aviad Segal, Tel Aviv (IL); Jack Cohen-Martin, New York, NY (US)

(73) Assignee: AditAll LLC., New York, NY (US)

( * ) Notice: Subject to any disclaimer, the term of this patent is extended or adjusted under 35 U.S.C. 154(b) by 516 days.

(21) Appl. No.: 12/127,873

(22) Filed: May 28, 2008

(65) Prior Publication Data

US 2008/0307310 A1    Dec. 11, 2008

Related U.S. Application Data

(60) Provisional application No. 60/940,977, filed on May 31, 2007.

(51) Int. Cl.
| | |
|---|---|
| G06F 3/00 | (2006.01) |
| G06Q 30/06 | (2012.01) |
| G06Q 30/02 | (2012.01) |

(52) U.S. Cl.
CPC ............... *G06Q 30/06* (2013.01); *G06Q 30/02* (2013.01); *G06Q 30/0277* (2013.01)

(58) Field of Classification Search
CPC .......... H04N 21/4622; G06Q 30/0276; G06Q 30/0241; G06Q 30/02; G06Q 30/0277; G06Q 30/0271
USPC ............... 715/723, 719, 716, 726; 705/14.72, 705/14.4, 14.67, 14.69, 14.73
See application file for complete search history.

(56) References Cited

U.S. PATENT DOCUMENTS

| | | | |
|---|---|---|---|
| 7,574,448 B2 * | 8/2009 | Volk et al. ............................ | 1/1 |
| 7,720,432 B1 | 5/2010 | Colby et al. | |
| 2001/0049824 A1 * | 12/2001 | Baker et al. ................... | 725/109 |
| 2002/0104096 A1 | 8/2002 | Cramer et al. | |
| 2002/0116716 A1 * | 8/2002 | Sideman ........................ | 725/91 |
| 2002/0147979 A1 | 10/2002 | Corson | |
| 2003/0023973 A1 | 1/2003 | Monson et al. | |
| 2003/0040962 A1 | 2/2003 | Lewis | |
| 2004/0085341 A1 | 5/2004 | Hua et al. | |

(Continued)

OTHER PUBLICATIONS

International Search Report of Application No. PCT/IL08/00734 dated Nov. 10, 2008.

(Continued)

*Primary Examiner* — Rashawn Tillery
(74) *Attorney, Agent, or Firm* — Pearl Cohen Zedek Latzer Baratz LLP

(57) ABSTRACT

A system for accessing development components, including an online video clip library of templates and an online music clip library, and enabling online production of user-friendly, custom-integrated media products. The system includes a Web application on a Website for hosting services for producers/advertisers/users. The system also includes a search engine that indexes the video, interactive Web formatting screens for selecting development components and producing the Web products in said Web application, an online MIXER module for editing and playing said selected video, an online editing program, which allows the advertiser/user to edit his advertisement himself, outside WebServices accessible by said advertisers of said Web application via the internet for custom-integrating, encoding and formatting the video clips and a parallel platform in which content producer/users and commercial libraries could upload their raw material and set their price.

34 Claims, 28 Drawing Sheets

(56) References Cited

U.S. PATENT DOCUMENTS

| | | | |
|---|---|---|---|
| 2004/0088313 A1* | 5/2004 | Torres | 707/101 |
| 2004/0103026 A1 | 5/2004 | White | |
| 2005/0251448 A1 | 11/2005 | Gropper | |
| 2006/0075033 A1 | 4/2006 | Bienstock et al. | |
| 2007/0055535 A1* | 3/2007 | Mowry | 705/1 |
| 2007/0061022 A1 | 3/2007 | Hoffberg-Borghesani et al. | |
| 2007/0107011 A1 | 5/2007 | Li et al. | |
| 2007/0112837 A1* | 5/2007 | Houh et al. | 707/102 |
| 2007/0156524 A1* | 7/2007 | Grouf et al. | 705/14 |
| 2007/0162846 A1 | 7/2007 | Cave et al. | |
| 2007/0174774 A1* | 7/2007 | Lerman et al. | 715/723 |
| 2007/0204310 A1 | 8/2007 | Hua et al. | |
| 2007/0234214 A1 | 10/2007 | Lovejoy et al. | |
| 2007/0245379 A1 | 10/2007 | Agnihortri | |
| 2008/0098032 A1 | 4/2008 | Wu | |
| 2008/0109300 A1* | 5/2008 | Bason | 705/14 |
| 2008/0109306 A1* | 5/2008 | Maigret et al. | 705/14 |
| 2008/0183577 A1* | 7/2008 | Evans | 705/14 |
| 2008/0184288 A1* | 7/2008 | Lipscomb | 725/32 |
| 2008/0195949 A1* | 8/2008 | Baum et al. | 715/723 |
| 2009/0276334 A1 | 11/2009 | Hosoda et al. | |
| 2010/0042503 A1* | 2/2010 | Farmer | 705/14.72 |

OTHER PUBLICATIONS

Office Action issued by the United States Patent and Trademark Office for U.S. Appl. No. 12/490,688 dated Jun. 19, 2013.

Office Action issued by the United States Patent and Trademark Office for U.S. Appl. No. 12/490,688 dated Feb. 15, 2013.

Office Action issued by the United States Patent and Trademark Office for U.S. Appl. No. 12/490,688 dated Sep. 13, 2012.

Final Office Action from U.S. Appl. No. 12/490,688 dated Sep. 11, 2014.

* cited by examiner

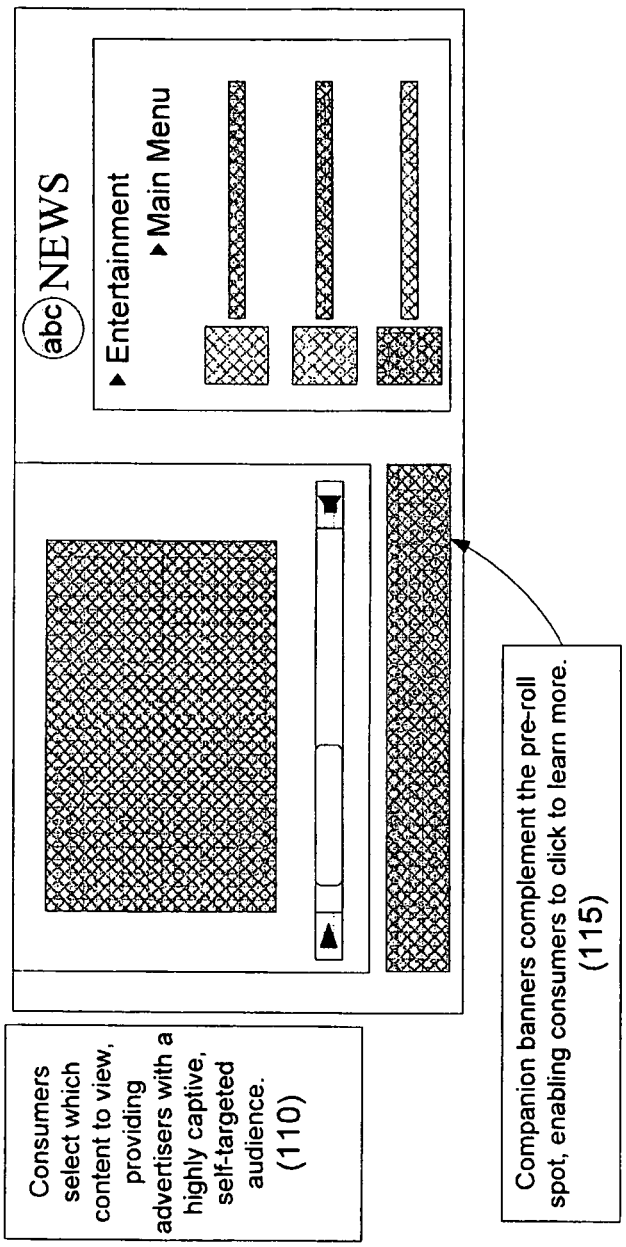
Prior art Fig. 1a

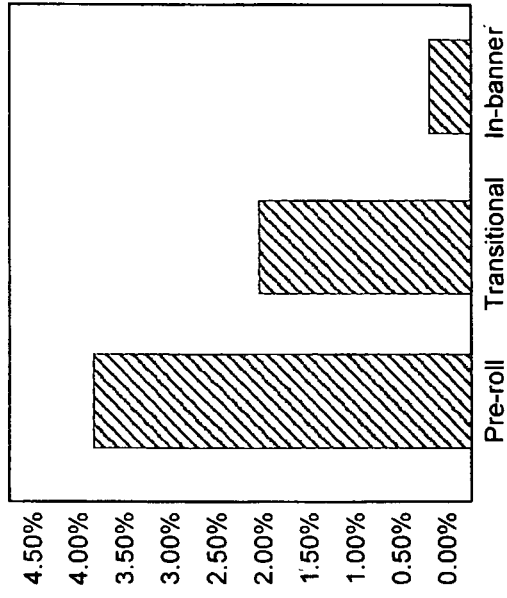
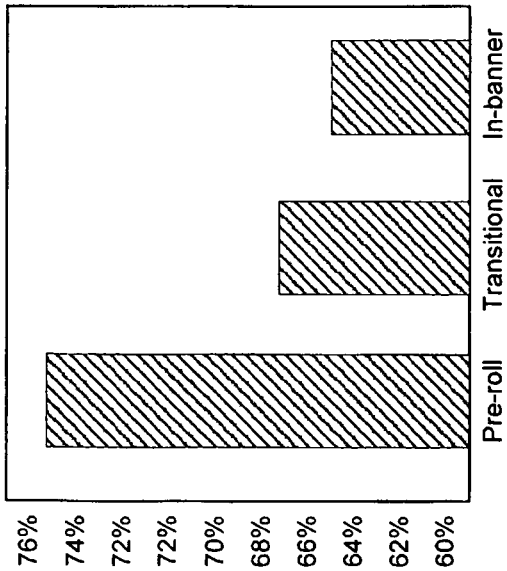
Fig. 1b

CreatorSearchResult.aspx
Welcome   Your Balance: 100$

| Home | Upload | Account | Profile |

Email _____
Password _____
Register
Login >

Search _____ [Search]
[Advanced]

Best Sellers
Recently Added
My Media
My Pending Media
My Favorites
Unused

Contact us   About us

[+] Templates (64)

Driving Grid A
Length: 15 sec.

Blackhawk water fountain
by: PTproductions
Length: 14sec.

Car of Highway with "Hichcock zoom"
Length: 14sec.

Yellow Aspen Leafs
Status: Rejected (410)

Previous 1 2 3 4 5 6 7 8 9 10 Next        # Per Page     Order by: [Date ▼]

[+] Footage (16)

Blackhawk water fountain
by: PTproductions
Length: 14sec.

Car of Highway with "Hichcock zoom"
By: Disjecta
Length: 10 sec.

Yellow Aspen Leafs
By: Alejandro Tores
Length: 12 sec.

Clouds from Glastonbury tor
By: Lobster Pictures (420)

Previous 1 2 3 4 5 6 7 8 9 10 Next        # Per Page     Order by: [Date ▼]

[+] Music (16)

All in this together ▲

DJ massive- high volume
by: hallowzz
Description:
Tags: n/a view | info+comments (430)

Previous 1 2 3 4 5 6 7 8 9 10 Next

Legal   Terms of services   Privacy   Contact us

Favorites

| | |
|---|---|
| All In This Together<br>By: <%current user%><br>▶ (710) | DJ massive- high volume<br>By: hallowz<br>▶ Description:<br>Tags: n/a (710)<br>view \| info + comments |

[1][2][3] ...... [7] [Next]

Search

[_____] Search

○ By User Name   ●By Description

| | |
|---|---|
| Krush (720)<br>By: long_walker<br>▶ Description: Dub sounds<br>Tags: downtempo<br>view \| info + comments | LG3_bounce_01.02.02-180 (720)<br>By: lg3<br>▶ Description: slap, funk, bouncy, dub<br>Tags: slap, funk<br>view \| info + comments |
| Kik1 (720)<br>By: dub<br>▶ Description:<br>Tags: n/a<br>view \| info + comments | LG3 bounce_01.02 (720)<br>By: lg3<br>▶ Description: bouncy funk slap<br>Tags: slap,funk, bouncy, dub<br>view \| info + comments |
| dub techno bus line (720)<br>By: antti<br>▶ Description: This is a deep bassline with some lfo<br>Tags: deep, lfo, bassline, bass<br>view \| info + comments | amdek dub (720)<br>By: polyfonken<br>▶ Description: just playing with an amdek drum machine and some synths/fx<br>Tags: lofi,filter, drum, dub, machine<br>view \| info + comments |

[1][2][3] ...... [4] [Next]

Fig. 7

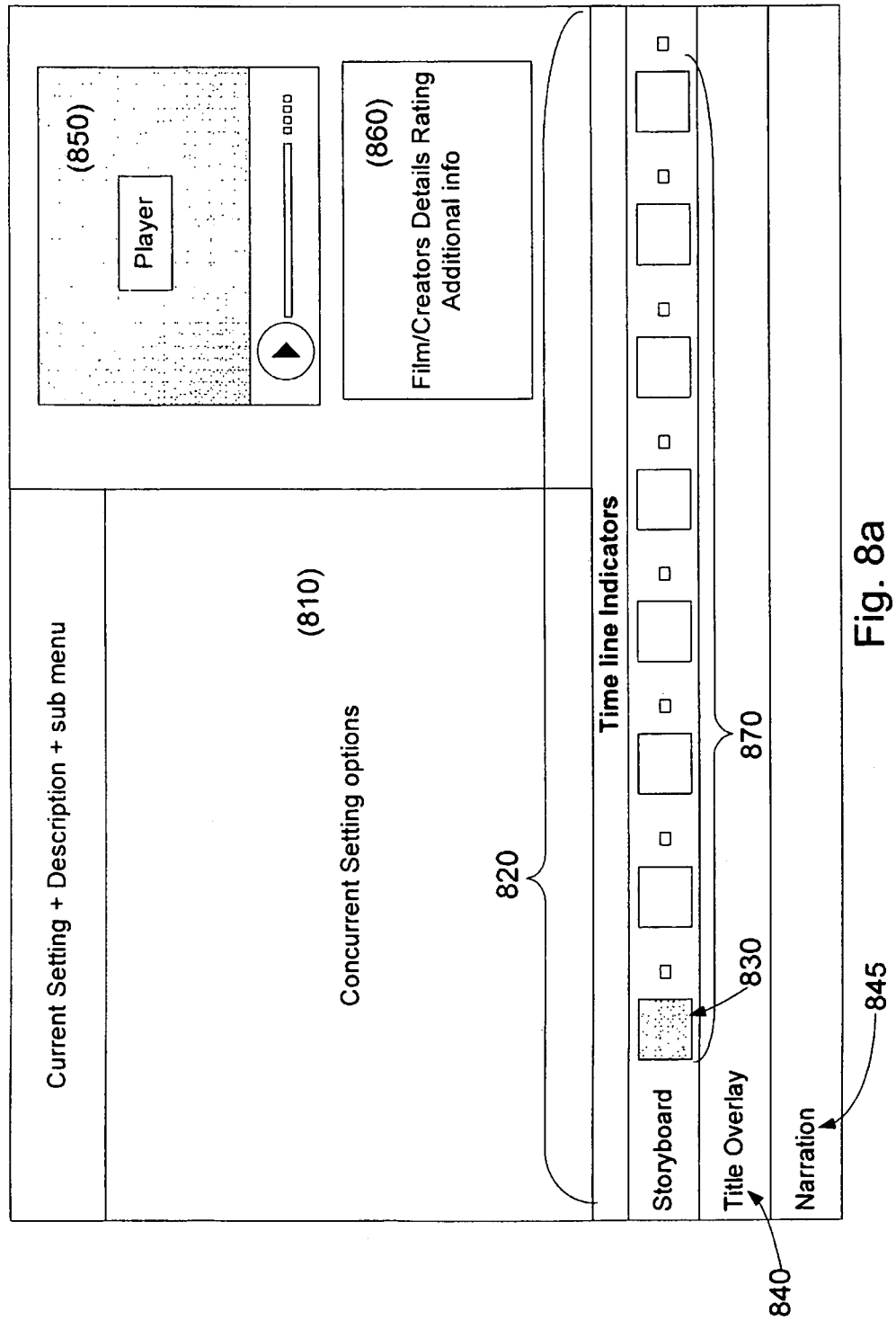

WEBSITE APPLICATION SYSTEM FOR ONLINE VIDEO PRODUCERS AND ADVERTISERS

CROSS-REFERENCE TO RELATED APPLICATIONS

This application claims priority from U.S. Provisional Application No. 60/940,977, filed May 31, 2007, which is incorporated herein by reference in its entirety.

FIELD OF THE INVENTION

The present invention generally relates to video production, and more particularly to a Web application system for online video producers and advertisers, affordably enabling ad conception to campaign rollout in real-time.

BACKGROUND OF THE INVENTION

The advertising market generates approximately a hundred billion dollars a year in America alone and is a huge force within the global economy. Without advertising, manufacturers and service providers would not be able to make themselves known to the public. In a competitive and advanced marketplace advertising plays a central role in helping new products penetrate the market as well building trust between a client and a specific product or service.

Television advertising as a media has created some legendary commercials. In the 1980's, during the third quarter of the Super Bowl, Apple Computer introduced the Macintosh computer with a 60-second Orwellian epic commercial called "1984." The spot cost $400,000 to produce and $500,000 to broadcast in its single national paid airing. The commercial turned the Super Bowl into a major ad event and began an era of advertising as news. Television advertising reached an all-time high in the 1990s with infomercials, huge mergers and ambush marketing.

In recent years there has been a major change in the internal division of media types open to advertisers, as advertising on the Internet is growing and accelerating, while older media such as printed newspapers and radio are fading.

Internet Advertising

The growth of Internet advertising since its 1994 birth has been truly phenomenal What started out with banners, as bland and common as roadside billboards has exploded into a rich-media interactive environment that may soon rival the rabbit hole in Alice in Wonderland. In the 1990's online advertising was born when HotWired signed up fourteen advertisers for its online debut. The following year saw the emergence and public acceptance of the Web as an interactive medium. Both United Airlines and Maytag introduced their Websites and promoted them through banners. By 1996, advertisers were promoting Websites using traditional media.

Now, online advertising is a world of rich media. Banners pop up into their own browser windows, advertisements appear on screen before the page is finished downloading and advertising interrupts online games and other interactions. Images are beginning to resemble television commercials. Online advertising is quickly becoming more diverse as sites cater to more traditional advertisers' and search for ways to better meet advertisers needs.

Forecasts for the future of Internet advertising are positive, and researchers are in agreement that advertising on the Internet will only grow and expand in the coming years. An outstanding trend, as supported by research, is the development of video advertising on the Internet. Early Internet advertising is based on banners and text announcements, but in the future the weight of video Internet advertising will grow and its reach will widen. As of today, there are four major types of video Internet advertising;

1. Pre-Roll Video Ads—Advertising that appears before the beginning of video content that a user is watching.
2. Mid-Roll Video Ads—Advertising that appears during the video content that a user is watching.
3. Post-Roll Video Ads—Advertising that appears after the video content that a user is watching.
4. In Banner Video Ads—Advertising videos that are integrated in the Web page. Such an ad is usually shown as a static slide picture that is taken from a video advertisement with a special mark, usually a triangle that shows PLAY. Clicking on the slide makes the advertisement start playing.

In-banner ads run as part of Web page content within a box on a Web page. Transitional ads appear between page displays, where the only content is the ad. Pre-roll ads run prior to user-requested video content as part of the same stream. See prior art FIG. 1a, Consumers select which content to view, providing advertisers with a highly captive, self-targeted audience. Companion banners complement the pre-roll spot, enabling consumers to click to learn more. Pre-roll advertising is the fastest-growing video format, thanks to its integration with user-requested content and similarities to television. See prior art FIG. 1b, reference block. Because of its impact and accountability, pre-roll video is in high demand, but supply is limited and execution is complex.

The most effective and TV-like form of online video advertising is found in the pre-roll format, but inventory is limited because of the limited amount of content publishers offer. Pre-roll tends to be more effective than banner. Therefore, frequency capping is needed most for pre-roll, which is the most effective form of online video, and also has the least inventory. Video production costs are still extremely high. An advertiser seeking scale has to send ten beta tapes to ten Web sites and have each encoded in different player formats. More coordination is needed on the publisher side.

One might be led to believe that streaming video commercials are the next "big thing." As broadband gradually replaces dial-up, it becomes possible for online users to receive video commercials with sound and motion quality equal to television. One of the mistakes of the past is to assume that content from traditional media could be re-purposed for the Web. That might have worked for recipes and baseball scores, but it didn't for news stories (which are now shorter and full of hotlinks). Magazine ad pages didn't translate to the Web successfully and neither will 30-second TV spots. TiVo and Replay TV notwithstanding, TV spots are made knowing that the audience is essentially passive and in many cases, downright inert. The audience hardly even picks up the phone and dials an 800 number anymore (unless it is to vote off a singer or a comic). There is no interaction with the ad, so it tends to be loud and convey a brand "feeling," rather than a product attribute. By the third or fourth exposure, you might start to remember the product name. Advertisers still have faith that the 30-second spot moves product off shelves.

But online, consumers are anything but passive. They are actively engaged in the medium and have the power to stop a video spot in a heartbeat. The idea that users idly "surf" the 'Net is a myth of bygone days. People go to the Internet with a purpose and infrequently go beyond their bookmarked sites. While this engagement with the medium means people are paying attention (and are poised to take advantage of the Internet's unique interactivity), it also means they are somewhat impatient. They will not sit still for 30 seconds of sight sound and motion.

However, for a Web ad 10-60 seconds is about right. It is enough time to engage the viewer then hand them off to a static Website or e-commerce shop, or the chance to play a longer video of their choosing. Everything in our lives has been time compressed and we have developed a shorter attention span. Just behind us is the MTV generation which can multi-task and will probably only see commercials in the context of five others things they are doing at the same moment. To that and still younger generations, 30 seconds of anything (unless they really like it) is an eternity.

A whole new industry will grow up around the creation of 10-60 second Internet streaming video commercials. But since it will be able to deliver a very short brand message, it will have to be inexorably linked to the interactivity of the Web in order to provide users who really want to engage, the additional information they want. The creative approach will have to be unlike anything on TV now, and there will have to a seamless transition to other Web resources. Implemented effectively, 10-60 second spots will pull in-market buyers to a place where retailers, dealers or even manufacturers know they have a hot prospect and can shorten the buying cycle. Pre-roll ads are under 15 seconds to avoid annoying the viewer and are custom created by the client or a creative team. Either way, they enhance brand image and message with high quality video content that plays to a Web savvy and educated demographic.

Video ads combine television's sight, sound and motion with the Internet's immediacy and accountability to reach and engage online audiences. Plus, online video overcomes the challenges that can accompany TV—including the increased use of digital video recorders (DVR's) and ad-skipping technologies.

Google, which began to be active in the marketplace only in the last years, changed the "rules of the game" of Internet advertising when it started to offer advertising based on search results. The company has succeeded in creating a new advertising market, and today it rules this market without opposition.

The advantage of Google is that it succeeded in providing a precise placement system for online advertising that was easy for advertisers to generate, available immediately and offered advertisers a campaign that is targeted for a well-defined population, whether based on geographic location or demographic profile. Google makes it possible to run a campaign without requiring a minimal budget and that opens the Internet advertising market to a wide range of small advertisers that previously did not have access to it. Before Google entered, campaigns were manually executed by advertising account managers who were not interested in accommodating small budgets. Google also brought a media advantage to the market. Google campaigns are directly executed by the advertisers enabled to control and change its definitions at any given moment. Before Google campaign change necessitated intervention of the advertising company's representative and therefore the nature of change was slow and infrequent. Google makes it possible for advertisers to change the definitions of their campaigns in real time and thus achieve better results.

Video advertising on the Internet is still not widely used, mainly because of the high production price involved. Even though it is possible to run low budget campaigns, production costs are what prevent small companies from using this option.

Television Advertising

As indicated previously, advertising on television is a vast industry that brings in approximately seventy billion dollars a year. The majority of advertising budgets are found in the hands of big companies that invest enormous sums in the production of commercials and broadcasts. The cost of production of a television advertisement ranges to hundreds of thousands of dollars, where even the most economical productions range to the tens of thousands of dollars. Additionally, some production budgets can range well into the millions of dollars. Television advertising is the accepted way for advertisers to create awareness and loyalty to their brand, and it is agreed that television is the most effective medium through which to emotionally involve viewers in a product or service. In light of the high production cost, few small businesses use television as an advertising platform.

Naturally, not all advertising broadcast time on TV is used to its fullest advantage. To be sure, if a potential advertising slot is not sold to an advertiser, once the time of the slot passes it expires and thus the broadcasting station cannot profit from it anymore. This creates a time limit on the viability of each advertising minute on TV. Within that, there are a lot of advertising minutes that could be sold at a price that would be affordable to small businesses; however selling these "unused" time slots poses two challenges:

One challenge is the production cost of the advertisement that stands at tens of thousands of dollars;

The second challenge—before Google, the treatment and selling of broadcast time on the Internet was done manually and therefore there was no financial justification for low budget businesses to be involved.

Production Cost

Google, the cable companies, and additional bodies, have already declared their intentions to develop an automatic system that will enable buying and creating of television advertisements, in a manner that will open the market to small advertisers as well. Here too, the central problem remains the production cost of the advertisement itself.

The prior art provides four ways for the advertiser to acquire a video advertisement that would remain in its possession during a campaign:

1. Hiring a production company that would produce and film the ad for the company. In this type of production, many professional personnel are involved—screenwriters, filmmakers, narrators, recording artists, actors and editors—and therefore a quality production would not succeed without a budget of tens of thousands of dollars.

2. Developing a production that is based on video library material only. In this case, the process itself would be complicated because it requires a search in a number of different libraries to find video clips, voice and effects. This requires hiring professional personnel that would execute the search. It is a complicated process to be the middleman between the production and the client because the latter cannot be involved in the creation process itself, but will only receive the finalized product. If the client wants to participate in the production process, the time of the production would lengthen, and the price would rise.

3. Purchasing from companies that offer half ready made templates. The client is invited to choose the template that fits a specific advertiser. This method has two central disadvantages.

First, the production process is limited in its ability to involve the advertiser; and Second, there are limited templates to choose from because they were prepared by company employees whose job it is to create templates.

4. Filming the advertisement based on self-production alone. In this case, the cost of production would be very low, however the quality of the final result is uncertain.

US Pat Applic. No. 20070156524, Systems and Methods for Content Customization, by Grouf, et al, discloses methods and systems for providing customized advertisements, and hereinafter is referred to as the "Spot Runner" application. The method, for example, including storing a set of templates of components of advertisements, the templates defining a set of media objects; receiving, over a computer network, information related to an advertiser; based on the information related to the advertiser, presenting to the advertiser, over the computer network, a list of a subset of the set of templates of at least components of advertisements; receiving from the advertiser a selection of a template from the list of the subset of the set of templates; playing the template that the advertiser selected, without custom information from the advertiser; prompting the advertiser to provide input to create a customized advertisement based on the selected template; and creating a customized advertisement from the selected template and the input provided by the advertiser. The method may include using an edit decision list to represent organization of objects in templates.

Thus it would be advantageous to have an improved system and method for economical, user-friendly, user-empowered interactive production of a vast library of 10-60 second Internet and Television commercials.

SUMMARY OF THE INVENTION

Accordingly, it is a principal object of the present invention to enable the advertiser to create video advertisements himself, ads that are compatible with the Internet, TV and cellular networks, at a competitive price and with full creative flexibility.

It is one further principal object of the present invention to dramatically decrease video ad production cost, while speeding up the production and creation process.

It is one added principal object of the present invention to enable ad conception to campaign rollout to all be done in real-time.

It is one more principal object of the present invention to enable quality production and competitive pricing for video advertisements.

It is still another principal object of the present invention to provide an improved system and method for economical production of a vast library of short video segments.

It is yet another principal object of the present invention to provide a comprehensive system and method for user-friendly, self-produced 10-60 second Internet and TV spot commercials from a vast library of short video segments.

It is one other principal object of the present invention to provide an improved system and method for user-empowered, interactive production of a vast library of 10-60 second Internet and TV spot commercials.

It is a further principal object of the present invention to provide an improved system and method for revenue-sharing production of a vast library of uploaded short video segments.

It is a yet a further principal object of the present invention to provide an ad request feature where an advertiser requests a specific video format and producers quickly produce appropriate submissions with suggested prices.

The present invention is an Internet-based platform for the creation, customization and distribution of video ads and a thriving community of video content producers. This service is one of the first of its kind, giving businesses the ability to create professional quality video ads at a cost that is significantly lower than traditional production methods and giving content owners a marketplace for the monetization of their content.

The present invention has four main features:

1. Providing galleries of raw material content: video clips, music clips, narration, audio or video effects and pictures that can be searched for content by the advertisers. One can also record himself online.

2. An online editing program that's located on the Website, which is coordinated with an online MIXER, which allows the advertiser to edit his advertisement himself in a simple and friendly way from the raw material that he chooses.

3. A system for distributing the advertisements is provided at the site to deliver material to advertising distribution networks according to advertising distribution agreements. Examples of such advertising distribution networks are Google™, ValueClick™, cable television companies or cellular providers. In the advertising distribution agreements the advertiser could define the targeted audience of the campaign, specify the budget and geographic coverage and start broadcasting the advertisements that have been created using the inventive system.

4. A parallel platform in which content producers and commercial libraries could upload their raw material and set their price. Non-uploaded raw material in commercial libraries would also be made accessible to the advertisers. The system of the present invention would also be able to follow-up each purchase that was initiated and pay the content producers and owners accordingly.

The present invention provides five main advantages:

1. Competitive price: The present invention is based on a do-it-yourself approach thereby obviating intermediaries. It does not require hiring a production company to create a ready-made model or template for the advertiser. Each template can be used to create a variety of customized ads.

2. Speed: The system enables immediate creation of advertisements. In contrast with prior art ad creation, the advertisement is likely to be ready within less than an hour and even be included in a campaign in the same time frame. The system eliminates response time. Ad conception to campaign rollout is done in real-time.

3. Variety: Advertisers' stand to have a wide selection of raw materials and content from which to choose. Tens of thousands of producers and professional libraries world-wide make their content available. The variety and amount is exceptional and unique to the present inventive method.

4. Full creative control of process; The advertiser himself prepares the advertisement and decides on its exact final look. By contrast, prior art advertising is prepared by a different person, not necessarily exactly on target to the needs of the advertiser and his taste. With the present invention, the advertiser knows exactly how the final advertisement will look even before he has purchased it and will not be surprised to discover changes that were done without his knowledge or agreement.

5. Quality: Despite cost savings, the present invention still promises final quality at a professional level. With the prior art, the only way for the advertiser to produce a product at a price level of $300-$700, for an advertisement that would be broadcast on television, would be to produce it himself. This prior art form of self-production cannot compete with the quality advertisement provided by the present invention, due to the benefits of a vast array of professional raw materials and advanced, but easily implemented editing capabilities.

The present invention gives publishers and developers of content an outlet for their work. Small, mid-sized and local businesses can tap this content for personalized advertising needs. Elimination of several layers of production lets this be done at prices affordable to even the smallest businesses.

The present invention provides a Web application system with an online video production tool, which allows small businesses to create their own short advertisements for the Web. The online videos can be 10-60 second video clips. Normally these clips cost between $5,000 and $50,000 to produce. This inventive tool enables production for a considerably lower cost, and therefore many more advertisers can use them.

The system is based on a template which the advertiser can customize. The template is based on content in the form of raw video clips created in advance by members of the community of content creation artists (producers). The video clips are ultimately played in a pre-roll period. Pre-roll is the time before a Website normally delivers a regular video for viewing.

That upload requires a few seconds, and this pre-roll time can be used for advertising by use of these customized 10-60 second video clips. For example, when CNN does a download of video news frames, there is a period before that download is available, and that period can be used as a pre-roll period for the advertisement of various good and services.

Other video ad formats, besides pre-roll, include:
Mid roll—The video ads run during the video content.
Post-roll—The video ads run by the end of the video content.
In banner video—The video ad appear inside a banner on a web page.
Click per play—The video ad appear at a search result page, similar to text ads.
Contextual video ads—during playing the video content, a text line appears next to the player window. Clicking on that line plays the video inside a pop up window or next to the original player window. (reference: http://newteevee.com/2007/05/11/youtubes-new-inline-ads-screenshots/)

The video clip is stored in the servers, and can be viewed from the producer's domain, where upload of various content materials has been provided by the community of producers. These materials include videos, audio, pictures and text, which can be placed in the library for searching by a producer/advertiser/user who wants to use these to create a template for his own needs. The advertiser can search the library to access a given template. He then customizes that template using an online mixer, by providing all the details, such as changing text, adding slogans, voice, music patterns, colors, background, images (i.e., images of the business or the business owner), the name of the business, address, logo, etc.

The main capability provided by the system is to take various sources of media content and integrate them in a video template. This template is then available for personalization and customization (the system can automatically personalize a different copy for each person) by the advertiser and also personalize the individual fields in the template to match the distribution list with features such as names, pictures, etc.

Once the advertiser has customized the template and created an advertisement, if he likes what he sees, he can then buy that customized ad for his own use. He has several options on the purchase, including having exclusive or non-exclusive use of that video clip, territorial use, industry-wide type use with certain segments of businesses, or time periods for which he will have the right to use this specific template.

The producers' community shares in the benefits of this system by deriving revenue once purchases of the video clips are made by advertisers. It an advertiser has purchased an advertisement (customized template), the money can be distributed, with a percentage each to the producer and the Website owner, perhaps a 50% split so that the producers who have uploaded content for which they have not been paid, can now be paid for their content and its creativity. The total cut of the revenues that goes to the producer, will be split between all the producers that had submitted the component for that specific template: the one that contributed the footage, the one that contributed the sound track and the one who put all those components together with his own idea for a unique template.

The components of the system include a Web application that uses a database and outside Web services for encoding and formatting the video clip in particular formats, such as flash or MPEG. These outside services may also host the clips or stream the clips for use by this Website. The Web application accesses outside servers for providing given services, such as encoding, storing and streaming the video clips. In the preferred embodiment, Web forms in the Web application are written in MicroSoft™ .net™ framework, and MacroMedia Flash™ is used for developing specific components inside the Web application. Other formats can be adapted for use with the invention.

The five major features of the system are:
Search (herein: Find-it): find the particular video clip, which the producer wants to use for his template
Edit (herein: Ad-it): edit the video clip and turn it into an ad; add to and change the various things related to that video clip, such as the text, music and background colors
Buy: The third feature allows you to purchase the ad and make it available for the advertiser's use. The ad can be published and sent to another Website, such as Google's Web advertising service. The advertiser can use a Web advertising service for publishing the video clip at various times and in various locations for a price which he establishes with Google, to develop a marketing campaign.
The fourth feature of the system is the producer's sub-domain where uploads occur from the community of producers who are rewarded once these clips become part of a published video clip that is used by a given advertiser who has purchased it.
Run: (herein Run-it): The fifth feature provides connecting with a Wizard, for example, to create an online broadcast advertising campaign, using such services as Yahoo! Video Advertising™, Spot Exchange™, and Google Adsense™ network as well as other networks.

A summary of additional features includes:
Video clips, soundtracks and sounds can be uploaded to our inventory for sale
Producers are screened by approval committee
Quality of production
Flow of content
Combinations of existing inventory can be mixed to form new ideas
Prices for clips are set by the Producer
Producers retain the copyright to their individual clips, the license is only for the completed video ad
Advertisers and producers have a simple, process patented mixer that lets them create customized content
Thousands of clips, soundtracks and sounds are available to choose from. These can be combined in any form to create a unique ad, all from stock content
Narration recorded by the advertiser further customizes the ad for their own purposes Graphics and titles can be added along with special effects that create a call to action, bringing customers to their business Hyper targeted delivery of advertisements Download a clip and self-distribute Utilize streaming web services to meet your advertising needs.

For example, a small hamburger stand in Chelsea, NYC, wishes to make a video advertisement. Using the present invention, they could shoot a commercial showing their world famous burger, and arrange for that ad to run from 11:30 AM to 1:30 PM on weekdays in the zip code of the location of the business.

The present invention is contrasted with the 'Spot Runner' application, described above, in terms of 6 major differences:

1. Community aspect of the present invention. The present invention creates the opportunity for the existence of a community of contributors/creators of the clips, which they upload to the database. The clips are provided by creator/users in the community and turned into ads by advertiser/users in the community.

By contrast, Spot Runner clips are created by their own production/editors in-house. Spot Runner is in the business of ad creation. Their clips are not generated by the users of the Spot runner Web site.

Thus, the present invention provides a larger variety of clips and a larger range of prices for these components.

Spot Runner does not allow for transparency in pricing in building the template from the video clips. The Spot Runner staff creates a few ad templates and sets prices. With Spot Runner there is little client control of the artistic content.

Thus, Spot Runner is a closed shop vs. the present invention, which is an open market. With the present invention:

a) More combinations are available;
b) Free market pricing for building ad templates is possible; and
c) A user-generated content marketplace is developed.

2. Output:

Spot Runner's business is air-time slots, i.e., sales of air-time slots at affordable prices. This enables advertisers to get exposure at low cost. They are in the air-time business and content is secondary to them.

By contrast, the present invention automates the output process. The user generates his own content and customizes it, so the user is spending his own time and the output (production) has reduced cost and self-managed cost since it is do-it-yourself.

Aditall™, assignee of the present invention, places the advertiser in the "production" business:

enabling more "hands-on" in production;
enabling connection of two sectors: producers and advertisers; and
allowing the output to be owned by the producer.

3. Ad Request:

The present invention provides a Bulletin Board for "seeking" raw material or a pre-packaged ad or to "float" an "ad concept," optionally with a suggested price;

The bulletin board could initiate activity by the creator community;

The bulletin board process connects the producer community with the advertiser community; and There are two approaches to the ad request production process:

1) Open Loop: an ad request initiates producer activity (an ad) which the requestor may purchase once it is uploaded and the requestor is notified; and 2) Closed Loop: an ad request could be used to identify a project to which a producer responds, which will probably result in a higher price established to "start" the work. The closed loop process also has an escrow feature, where a deposit is held to guarantee to the producer some payment/Furthermore the process has a) financial assurance and b) quality assurance: the "back office" Website manager and the advertiser have to approve the product.

4. Output channels: The present invention provides for various platforms, including Interne/cellular/mobile/TV/print media/banners/video format.

5. Mixer: The present invention supports video ads/video clips.

6. Customization/personalization supported by mixer:

The process of creating a template from a video clip is customization. The process of making an ad out of a template is personalization.

The template has a "placeholder" for insertion of dynamic personalized components, for example audio, text, images in the form of logo, telephone number, etc. Changing the info in the place holders is called personalization for different clients, different products, different outlets, etc. The content is variable and can be changed endlessly for a variety of media usages and a variety of targets. Each instantiation over the Internet can even be targeted to each individual recipient by adding "Hello John Doe" to an ad directed at John Doe and "Hello Jane Doe" to an ad directed at Jane Doe, etc.

A variety of personalized outputs can also be achieved automatically. For example, General Motors can produce an ad and can upload a list of car dealers, A set of ads can be produced, each with the name of a different car dealer in the proper place holder from the uploaded list.

Some components are static and cannot be changed. For example, the video is static after it has been customized. When creating a template the producer can decide which of the components are dynamic and which are not, and which of the properties of the dynamic components are dynamic and which are not. For example, text may be dynamic, but even though the wording may be changed, the font and color may not be changed.

The producer can:

1. Upload raw materials; video footage, music, narration, etc.
2. Customize a template using an ad concept and the uploaded elements, "My materials" or other producers' materials. The producer can also specify which parameters can be changed and which cannot.
3. Specify an ad request for specific video footage or narration, for example.

The template can be personalized to produce a specific ad as an end product. Certain features can be limited in their access or level treated.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIG. 1a is a prior art screenshot illustrating the art of pre-roll video advertising;

FIG. 1b is a pair of prior art graphs comparing the art of pre-roll video advertising with traditional forms of online advertising;

FIG. 4a is a screenshot of the producer/advertiser's search results and FIG. 4b is a screenshot of the customer's search results, constructed according to the principles of the present invention;

FIG. 4e is a screenshot illustrating a preferred embodiment of the next scrolled segment of the search results returned for "water," constructed according to the principles of the present invention;

FIG. 4f is a screenshot illustrating a preferred embodiment of the bottom scrolled segment of the search results returned for "water," constructed according to the principles of the present invention;

FIG. 7 is a screenshot of MUSIC GALLERY function, constructed according to the principles of the present invention;

FIG. 8a is an illustration of the PLAYER/MIXER client side control, as it appears on the advertiser interface, constructed according to the principles of the present invention;

LIST OF TABLES

Table Ia shows the organization of the Website pages according to the 3 domains;

Table Ib provides details of the producer/advertiser's HomePage;

Table II provides details of the page for Producer/advertiser Search Results as described below for FIG. 4a;

Table III provides details of the ADit stage 1 TEMPLATE creation function with respect to FIG. 5a described below;

Table IV provides details of the ADit stage 2 MIXER function with respect to FIG. 5b described below;

Table V provides details of the ADit PLAYER function with respect to FIG. 6 described below;

Table VI provides details of the list of slides as described with reference to FIG. 9a below, for the storyboard slide interface as described with reference to FIG. 10;

Table VII provides details of list of Interface Title Overlay Definitions as described with reference to FIG. 10 below;

Table VIII below provides details of Interface Narration Definitions 1100, as described below with reference to FIG. 11; and Table IX below provides details of the PLAYER functions.

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

As further described herein, the present invention provides a comprehensive system and method for user-friendly, self-produced 10-60 second Internet spot commercials from a vast library of short video segments.

The present invention discloses a Website having three domains for different types of advertisers and a variety of roles. The administrators domain handles a Master Role and a Multimedia Editor Role. The producer's domain has regular and VIP roles each for footage, sound and creation. Finally, there is the advertiser domain for the advertiser, who uses the inventive system and method to create video advertisements.

The art is defined Website preparation for users who interact with Websites in production of media content, etc. The "skilled person" is one who has familiarity with Website tools for media production.

Figure 2A:
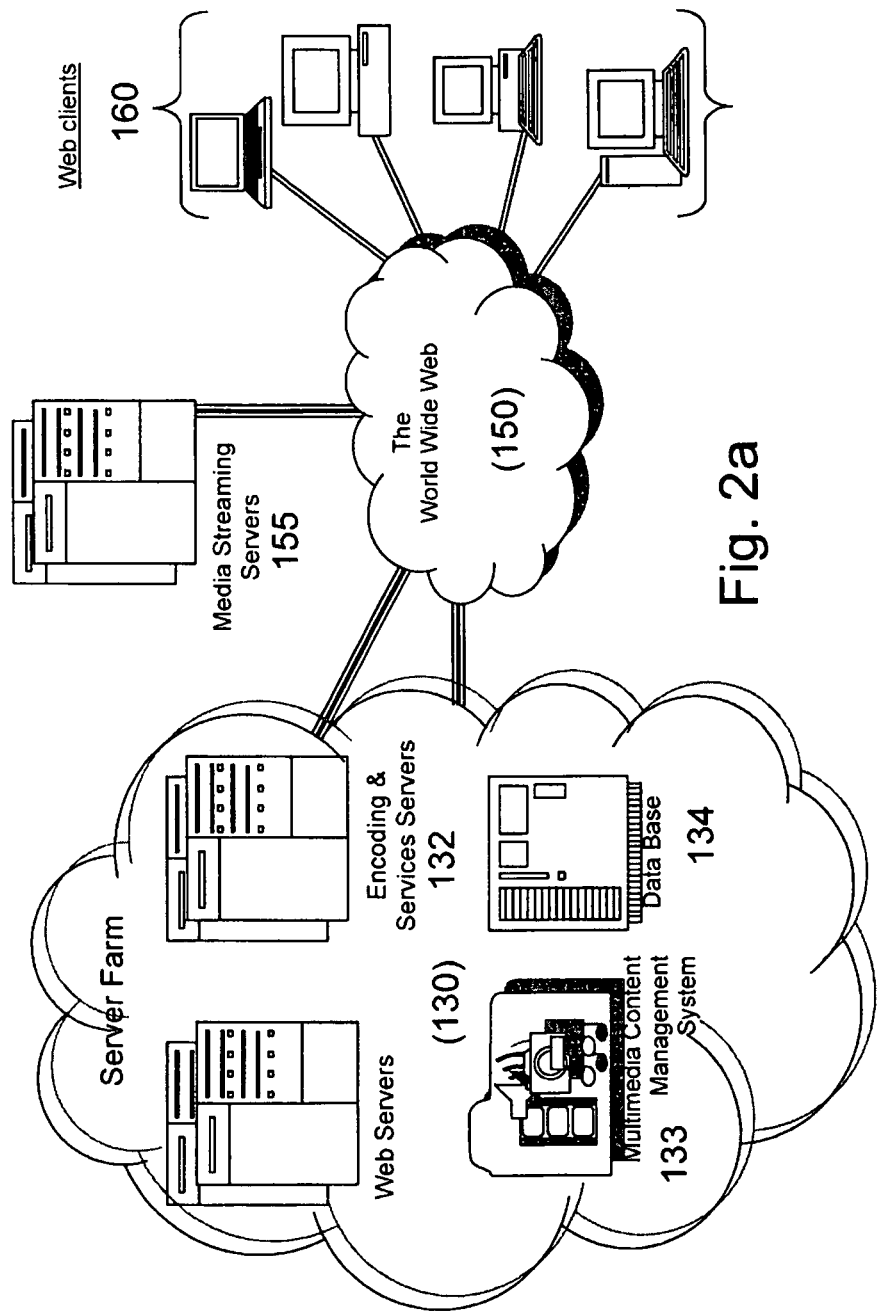
FIG. 2a is a schematic block diagram of the system architecture of the proprietary Website, constructed according to the principles of the present invention.

FIG. 2a is a schematic block diagram of the distributed system architecture of the proprietary Website, constructed according to the principles of the present invention. The components of the system include a Server Farm 130, that uses a database 134 and uses the Internet 150 to receive streaming media WebServices 155 for encoding and formatting the video clips in particular formats, such as flash or MPEG by means of Encoding and Services Servers 132 and a Media Content Management System 133. These outside services may also host the clips or stream the clips for use by this Website. Web clients also access the Web application via Internet 150 and their advertiser/browsers 160.

Figure 2B:
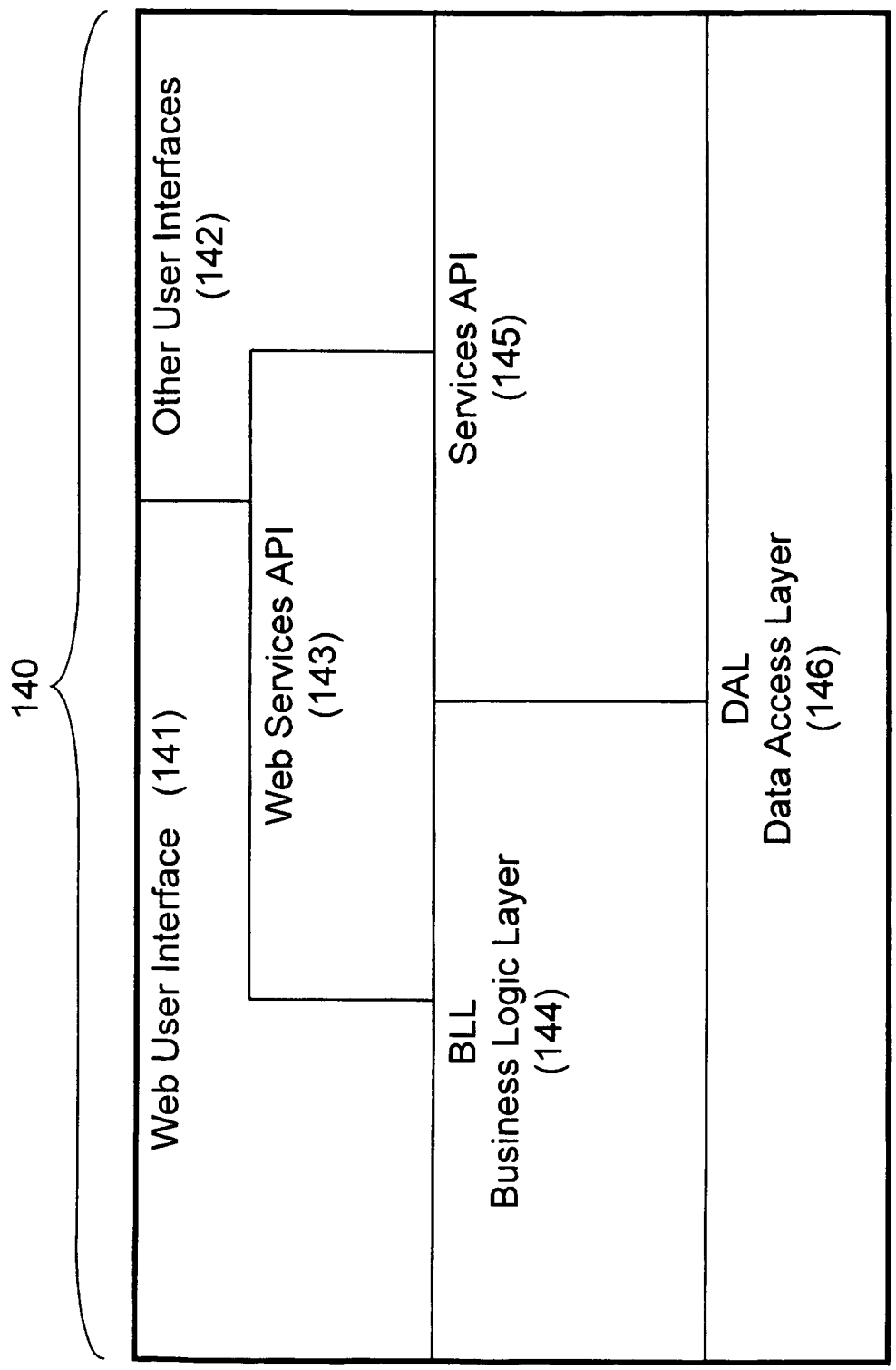
FIG. 2b is a schematic layout of the system application server of the Website of the present invention, constructed according to the principles of the present invention.

FIG. 2b is a schematic layout of the System Application Server 140 of the Website of the present invention, constructed according to the principles of the present invention. System Application Server 140 is one of the Web servers 131 of Server Farm 130 as described in FIG. 2a above. System Application Server 140 includes a Web Advertiser Interface 141, Other Advertiser Interfaces 142, a Web Services API 143, a Business Logic Layer 144, Services API 145 and a Data Access Layer 146.

Figure 2C:
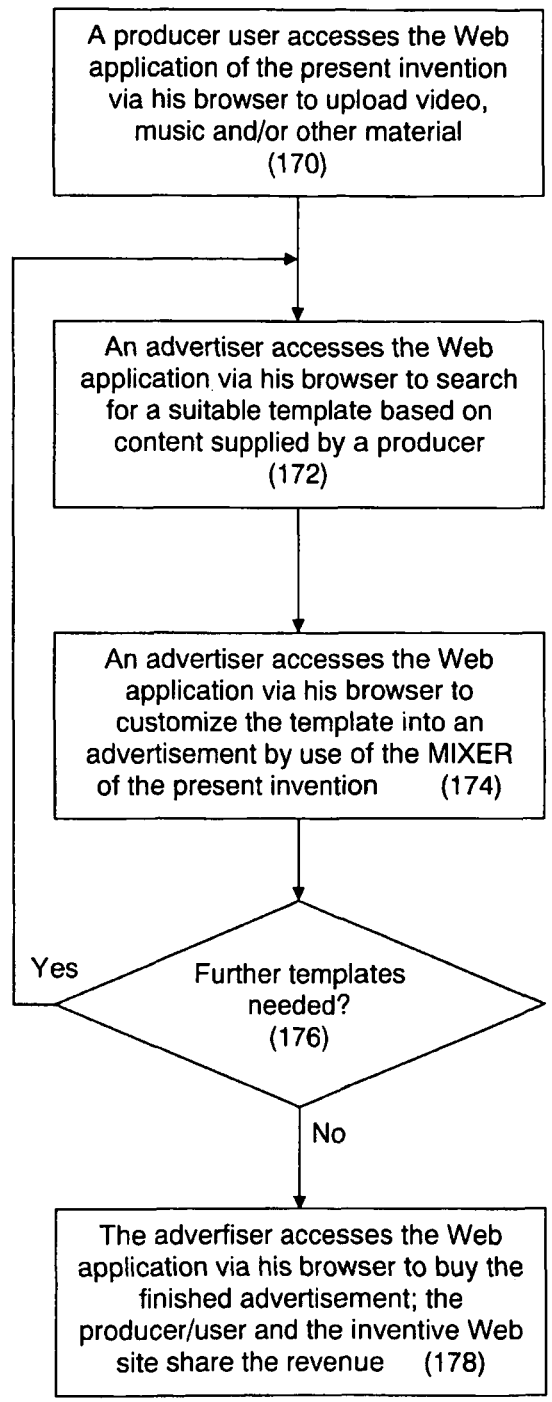
FIG. 2c is a flow chart of the method of the present invention, constructed according to the principles of the present invention.

FIG. 2c is a flow chart of the method of the present invention, constructed according to the principles of the present invention. A producer/advertiser/user accesses the Web application of the present invention via his browser to upload video, music and/or other material in block 170. An advertiser accesses the Web application via his browser to search for a suitable template based on content supplied by the producer/advertiser/users in block 172. An advertiser accesses the Web application via his browser to customize the template into an advertisement by use of the MIXER of the present invention in block 174. If further templates are needed in block 176 the advertiser again accesses the Web application via his browser to search for a suitable template based on content supplied by the producer/advertiser/user in block 172. If not, in block 178 the advertiser accesses the Web application via his browser to buy the finished advertisement. The producer/advertiser/user and the inventive Web site share the revenue.

The following description relates to the Website application, which is illustrated via various screenshots having features and parameters for the user to work with and to adjust/customize in production of the video ad. In some portions of the description the features of the screenshots are presented in outline form only, as their use will be apparent to a person skilled in the art.

Figure 2D:
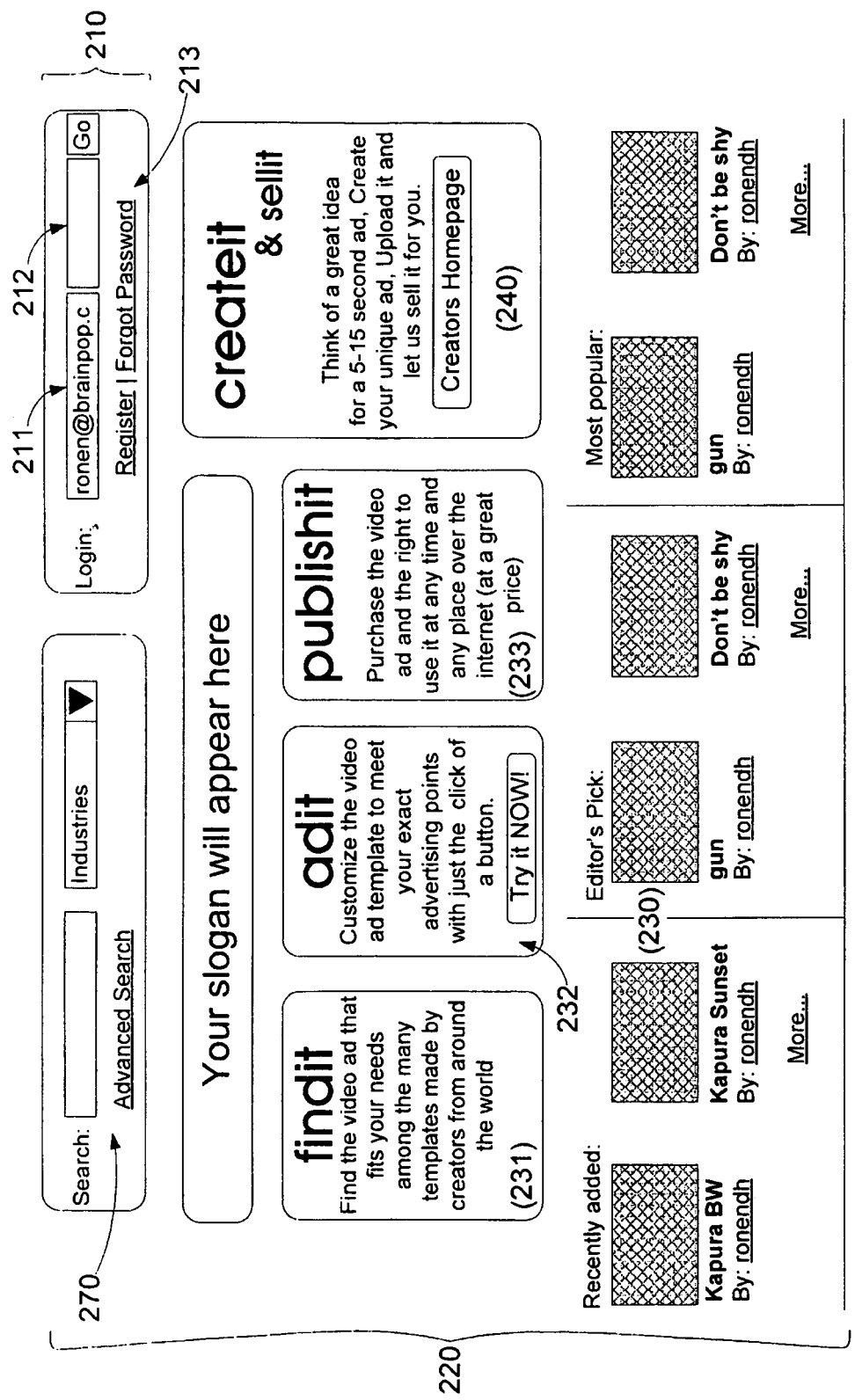
FIG. 2d is a screenshot of the Home Page of the Website of the present invention, constructed according to the principles of the present invention.

FIG. 2d is a screenshot of the Home Page of the Website of the present invention, constructed according to the principles of the present invention. The LOGIN 210 is displayed first and then the Home Page 220 is displayed.

The following is fixed for all site pages:

Before login 210 the following are shown: Advertiser name 211, password (PW) 212, forgotten PW 213, remembered PW and registration. If after login 210: The customer can access the major activities in the Advertiser's HomePage (see FIG. 4c) as described below, then he returns to the producer/advertisers' homepage, otherwise he return to the customers' homepage.

The main activities of customer's domain 230 and the producer/advertiser's domain 240 are depicted and described on Home Page 220. The activities of Advertiser's Place are separated into 3 stages: FIND-it 231, AD-it 232 and RUN-it 233. FIND-it 231, for example, refers to locating an almost complete ad with video and music already mixed or a "start-from-scratch" raw video clip.

Thus, there are 2 basic types of ads, a pre-packaged that is almost complete, including video, music and slogan. All an advertiser needs to do is personalize the ad with his or her business details, and the ad is ready for use. This is the simplest way to buy an ad.

Start-from-scratch means that instead of customizing Pre-Packaged ads, one can create an ad from start to finish. One logs into the Advertiser Place using an e-mail address and password. Ads can be created personalized by choosing each component of the ad to fit personal taste Details are now provided for the advanced search feature 270. The search is done according to the following formats:
 text search comprising description and key words search 270 (in text window)
 media type—within the list of media types (in selection window)
 range of dates—item creation date (command date: From, To)
 name of the creator/producer/user—(in text window)
 type of user—VIP or regular (in selection window).
 Industry—from the list of industries (from a wide selection).
 Mood—from a list of MOOD's (from a wide selection)
 price range—free text, numbers only (text window: From, To)

Figure 3A:
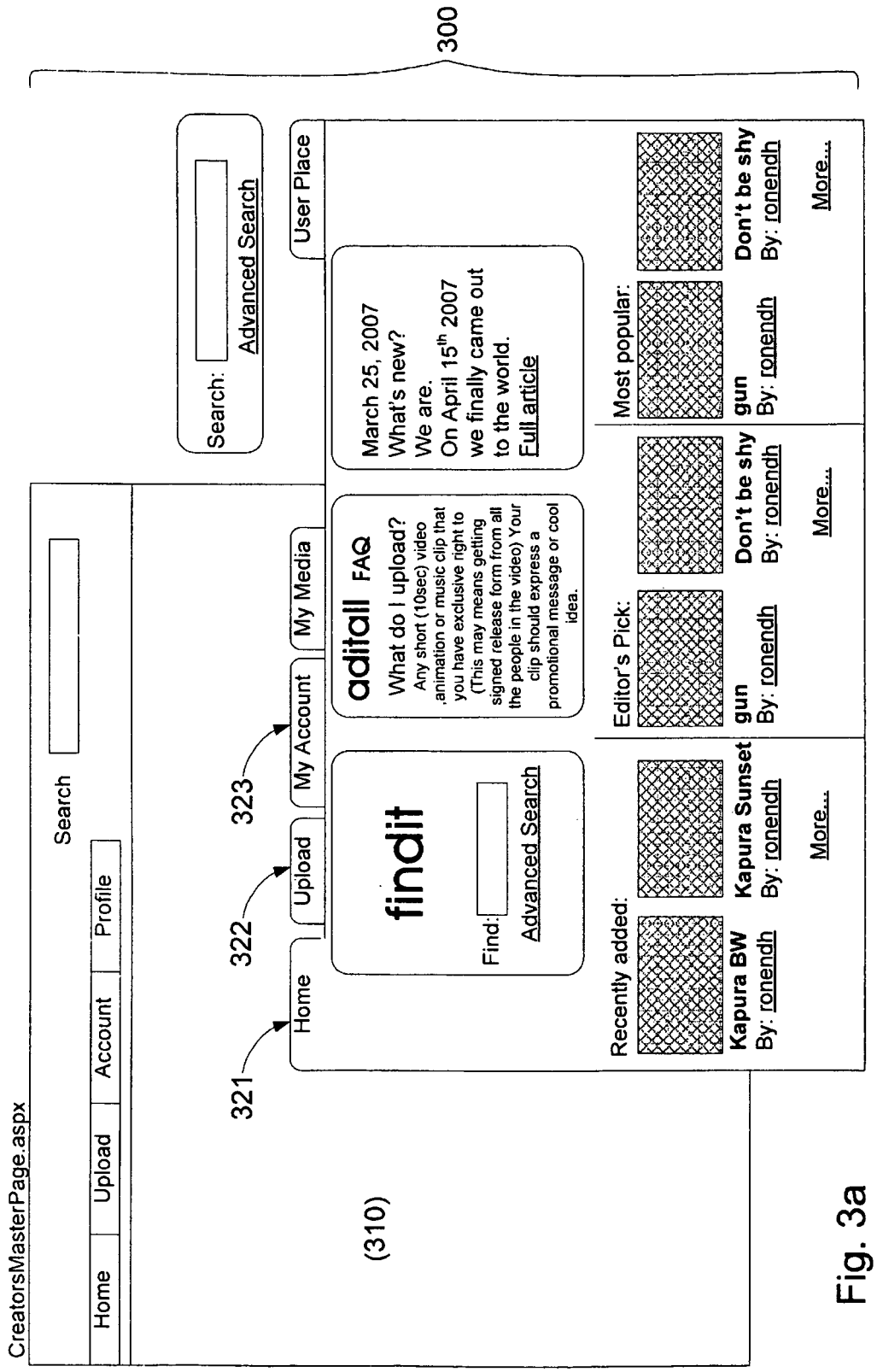
FIG. 3a is a pair of screenshots illustrating the Producer/advertiser's Domain, which includes the Producer/advertiser's MasterPage and the Producer/advertiser's HomePage, constructed according to the principles of the present invention.
Figure 3B:
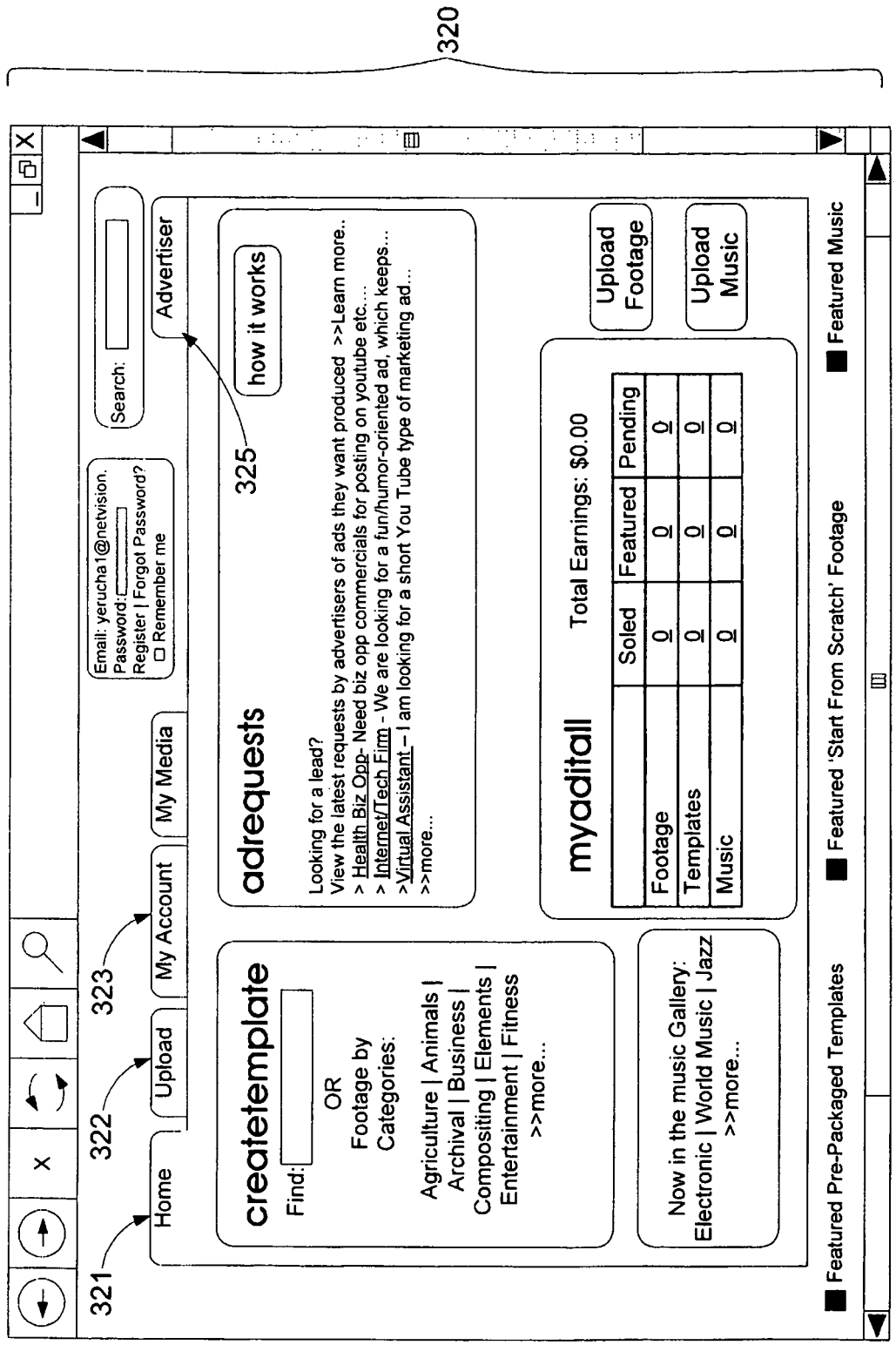
FIG. 3b is a screenshot illustrating a preferred embodiment of the Producer/advertiser's HomePage, constructed according to the principles of the present invention.

FIGS. 3a and 3b are a pair of screenshots illustrating the Producer/ad creator's Domain 300, which includes the Producer/ad creator's MasterPage 310 and the Producer/ad creator's HomePage 320, constructed according to the principles of the present invention. The Home tab 321 returns to the creators home page when not there, as it is in FIG. 3a. The Upload tab 322 invokes a "dropdown" menu for footage and music. The My Account tab 323 returns to the account page.

FIG. 3b is a screenshot illustrating a preferred embodiment of the Producer/ad creator's HomePage, constructed according to the principles of the present invention. The Home tab 321 returns to the creator's home page when not there, as it is in FIG. 3a. The Upload tab 322 invokes a "dropdown" menu for footage and music. The My Account tab 323 returns to an account page, which summarizes the charges incurred to date. The My Media tab 324 invokes a "dropdown" menu for My Featured Media, My Drafts, My Pending Media, My Rejected Media and My Favorite Media. The Advertiser tab 325 returns to the advertiser/user home page.

Figure 4B:
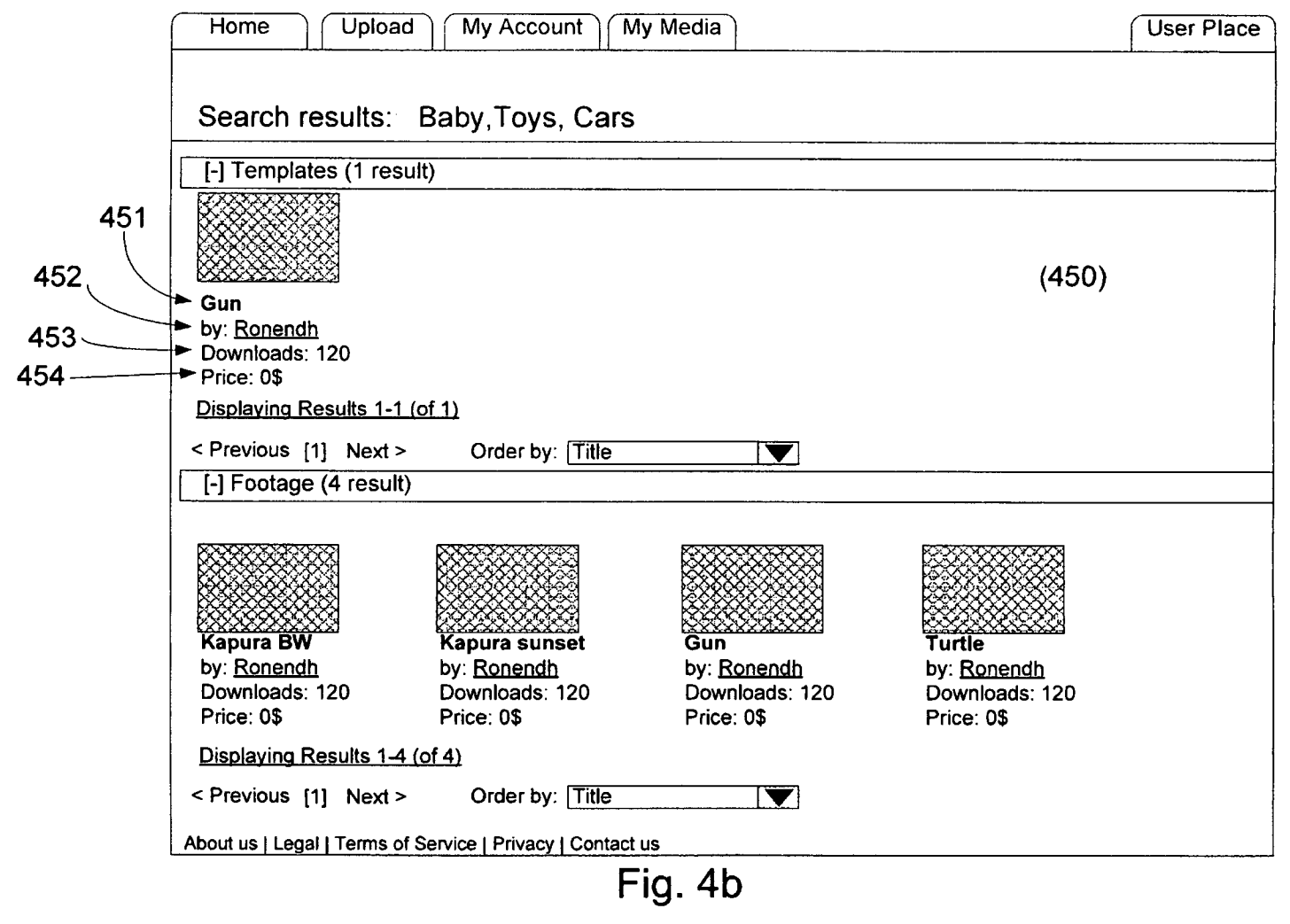

FIG. 4a is a screenshot of the producer/creator's search results 400 and FIG. 4b is a screenshot of the advertiser's search results, constructed according to the principles of the present invention. Search results are shown as items for templates 410, footage 420 and music 430. For every item, the following details are presented:
 caption
 description
 Thumbnail (mouse over the video display)
 name of producer/advertiser (link to the search by user)
 number of downloads
 price The following descriptive information is provided for the customer's search results 450:
 Item name 451;
 Producer/advertiser's name 452;
 Sequence number of the download 453; and
 Price 454.

Figure 4C:
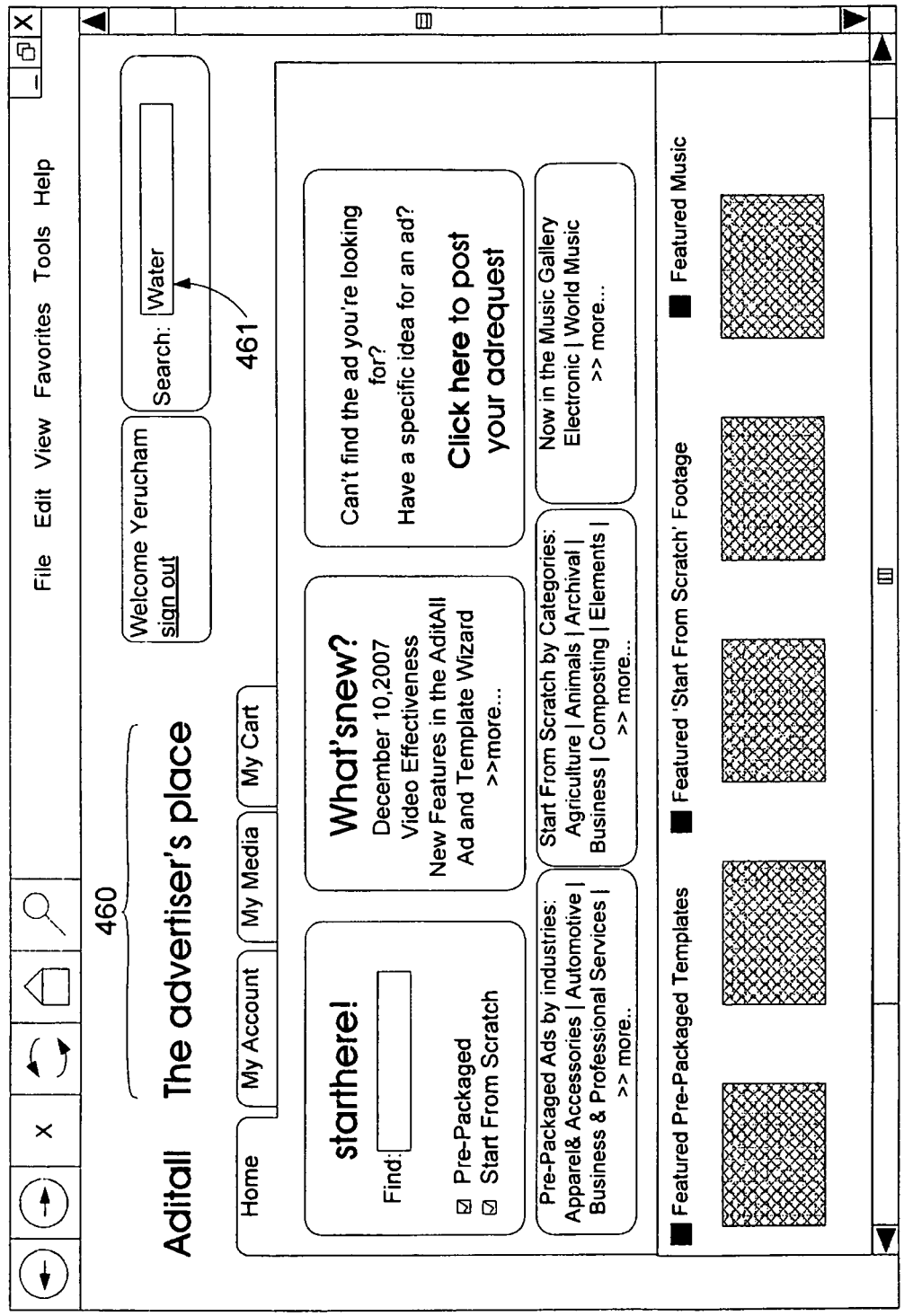
FIG. 4c is a screenshot illustrating a preferred embodiment of the advertiser/user's HomePage, constructed according to the principles of the present invention.
Figure 4D:
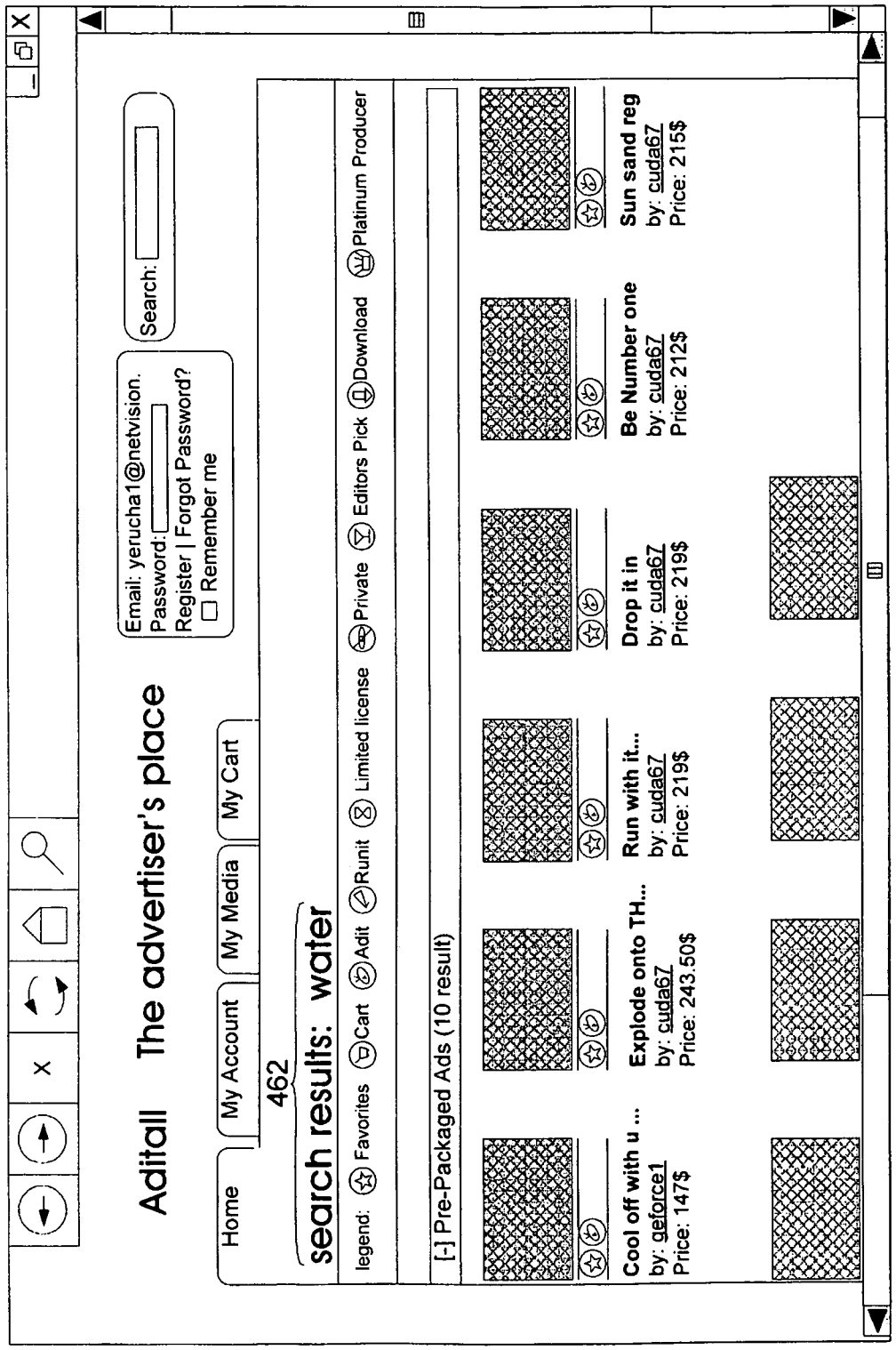
FIG. 4d is a screenshot illustrating a preferred embodiment of the top segment of the search results returned for "water" 462, constructed according to the principles of the present invention.
Figure 4E:
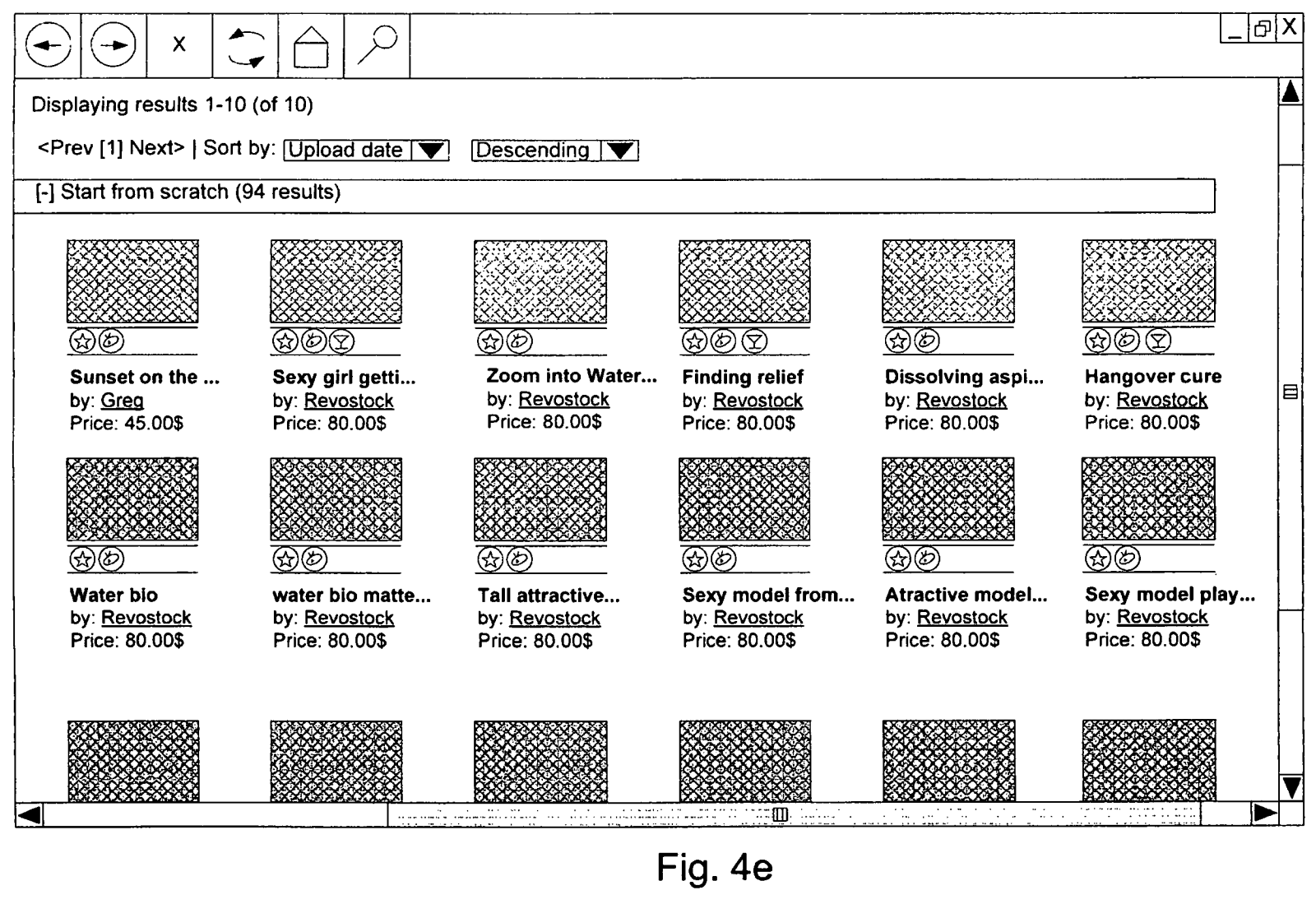
Figure 4F:
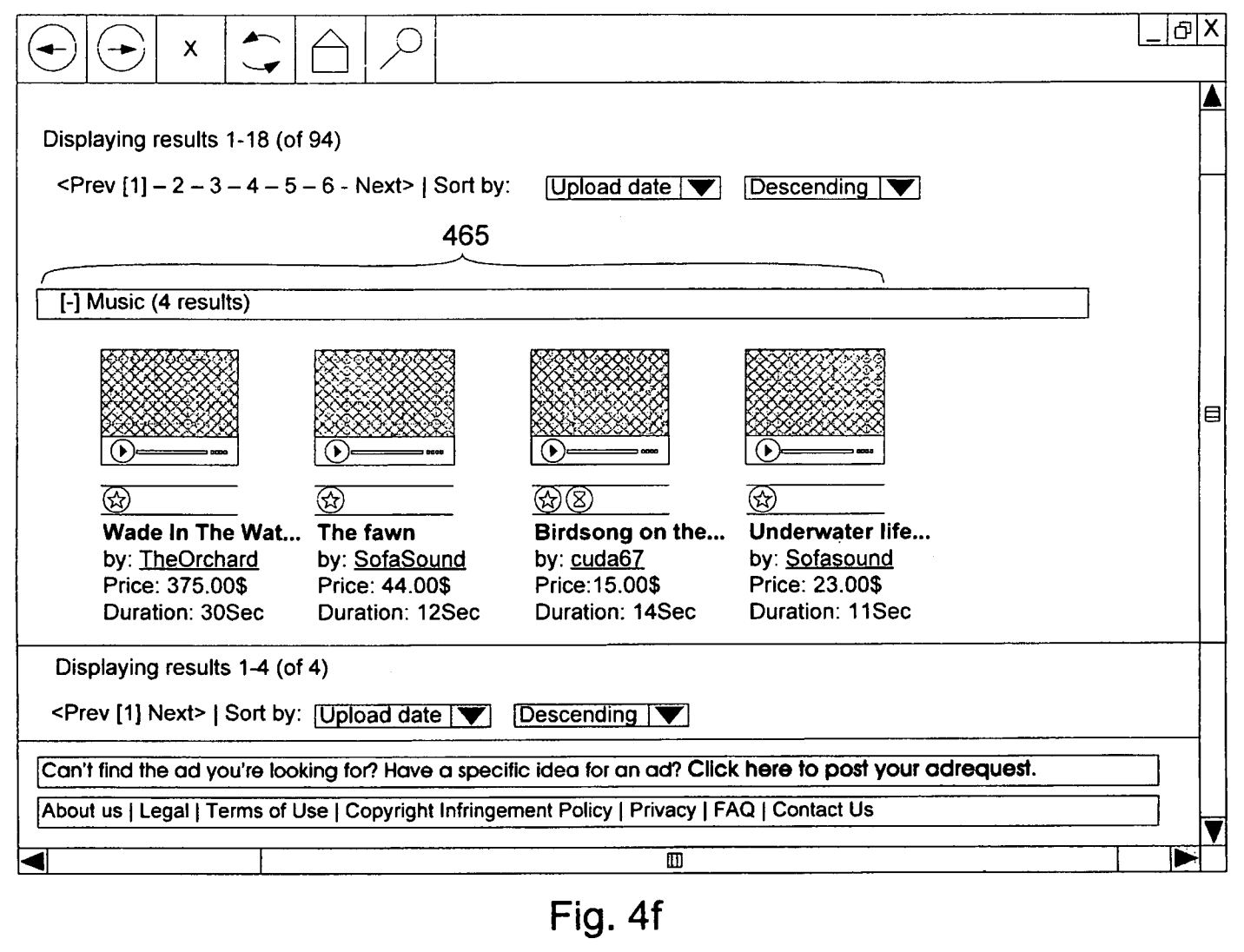

FIG. 4c is a screenshot illustrating a preferred embodiment of the advertiser/user's HomePage 460, constructed according to the principles of the present invention. A search for water 461 returns the screen of FIG. 4d. FIG. 4d is a screenshot illustrating a preferred embodiment of the top segment of the search results returned for "water" 462. Ten pre-packaged ads are shown by block 463, with a representative image, title, producer and price. FIG. 4e is a screenshot illustrating a preferred embodiment of the next scrolled segment of the search results returned for "water." The first ten "Start From Scratch" ads are shown 464 out of 94, with a representative image, title, producer and price. FIG. 4f is a screenshot illustrating a preferred embodiment of the bottom scrolled segment of the search results returned for "water." The 4 relevant music returns are shown 465, with a representative image, title, producer and price.

Figure 4G:
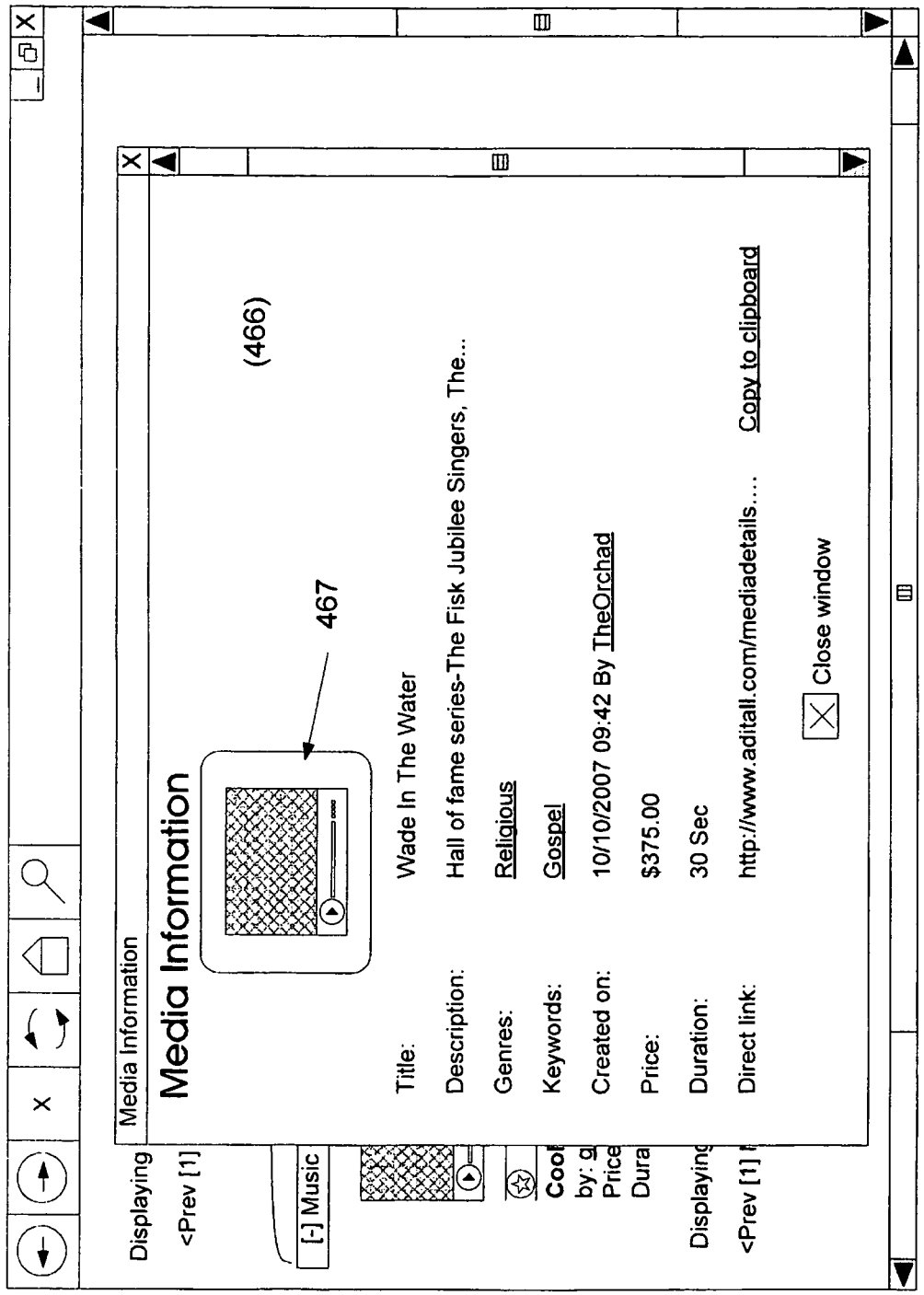
FIG. 4g is a screenshot illustrating a preferred embodiment of the "media information" provided for the selected music return, constructed according to the principles of the present invention.

By clicking on the first music return representative image, the "religious" selection, the screen of FIG. 4g appears. FIG. 4g is a screenshot illustrating a preferred embodiment of the "media information" 466 provided for the selected music return. By clicking on the enlarged "religious" selection representative image 467 on this screen the music will be played for the advertiser/user.

Figure 5A:
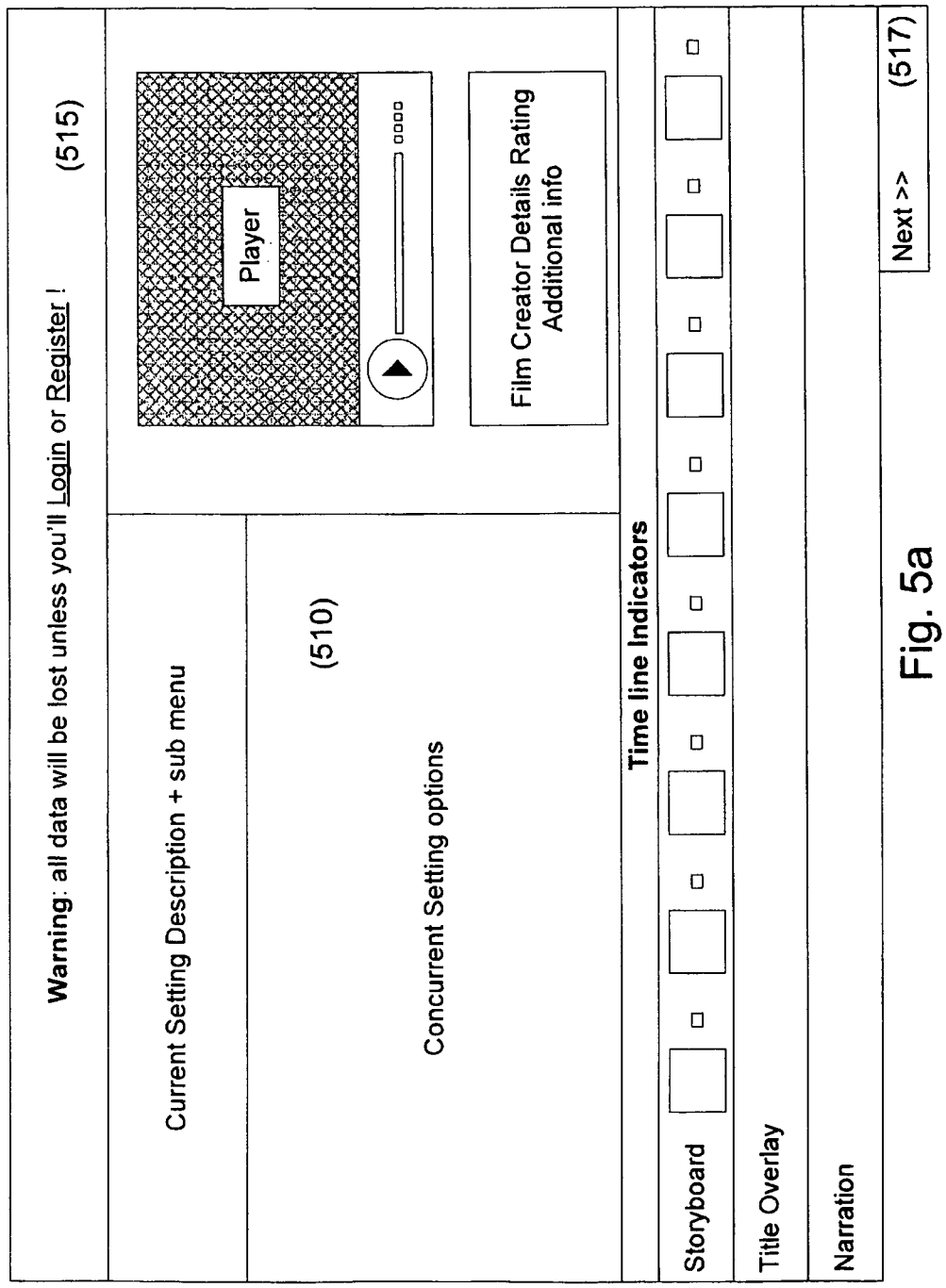
FIG. 5a is a schematic screenshot illustration of the ADit stage 1 TEMPLATE creation function and FIG. 5b is a screenshot of the ADit stage 2 MIXER function, constructed according to the principles of the present invention.
Figure 5B:
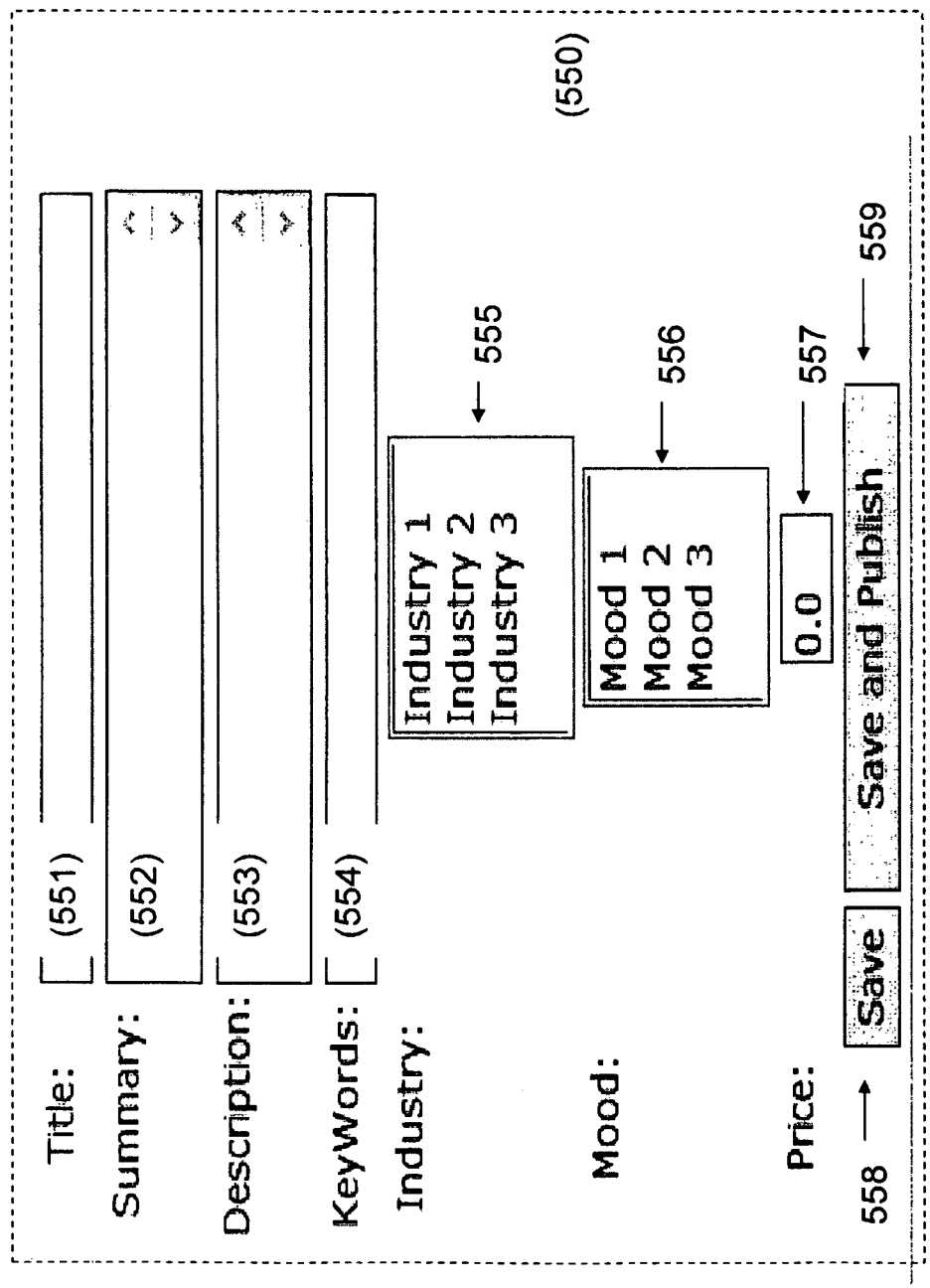

FIG. 5a is a schematic screenshot illustration 510 of the ADit stage 1 TEMPLATE creation function and FIG. 5b is a schematic screenshot illustration of the ADit stage 2 MIXER function 550, constructed according to the principles of the present invention. The Storyboard button causes the display of sequence of images 515 "summarizing" a video ad being created, for example. The Next button 517 brings up the next image in sequence 515 when in Storyboard mode, or the corresponding Title Overlay or Narration in those modes. Fields are shown for title 551, summary 552, description 553, keywords 554, industry 555, mood 556 and price 557. Also shown are the Save button 558 and the Save and Run button 559.

Figure 5C:
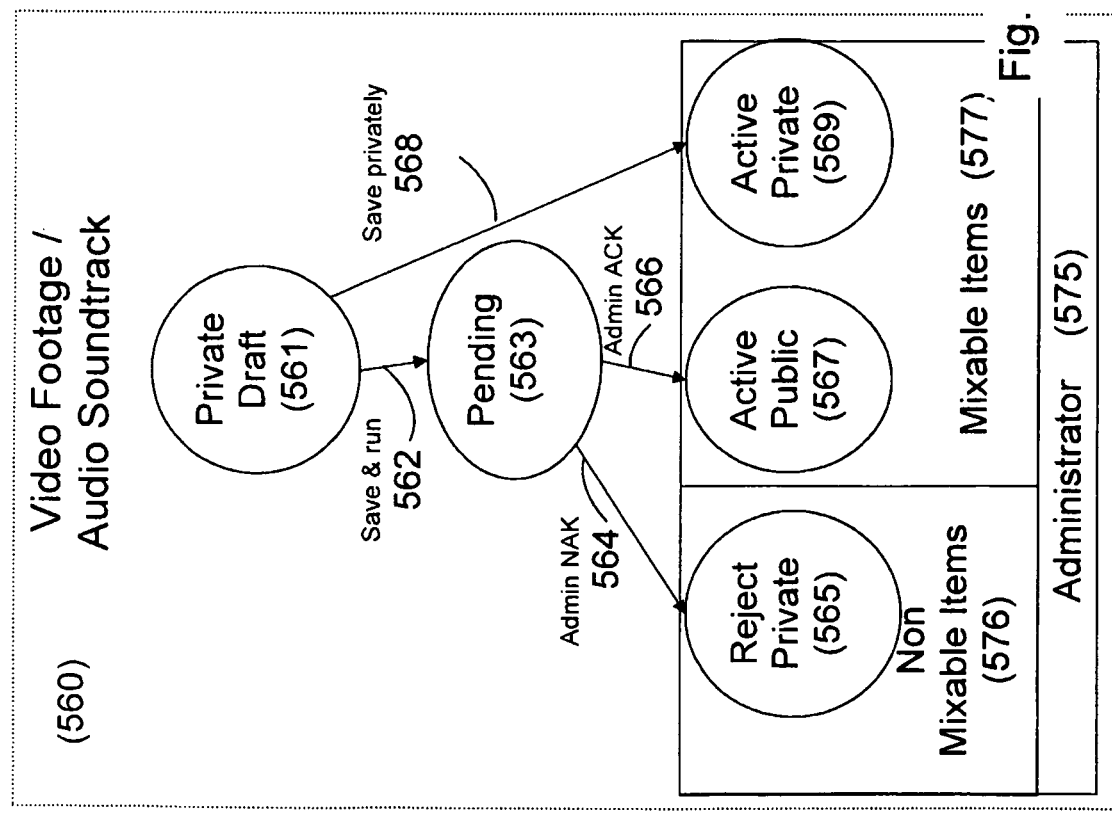
FIG. 5c is a schematic flow diagram of the media item lifecycle, constructed according to the principles of the present invention.

FIG. 5c is a schematic flow diagram of the media item lifecycle, constructed according to the principles of the present invention. The various roles are summarized in TABLE Ia below at the end of the text. The video footage is combined with the audio soundtrack 560. A producer/user creates a private draft 561. If he decides to save and run the ad, as represented by path 562, then private draft 561 is pending 563 until an administrator 575 decides whether it is non-mixable 576 or mixable 577.

If it is non-mixable 576, administrator 575 issues Admin NAK, as represented by path 564 and its status/access is reject private 565. If it is mixable 577, administrator 575 issues Admin ACK, as represented by path 566 and its status/access according to notation table 575 is active public 567. If advertiser/user decides to save it privately, as represented by path 568, then private draft 561 is considered mixable 577, and its status/access is active private 569.

At the stage of an advertisement 570, the advertiser/user decides whether to edit and save the advertising private draft 571, as represented by path 574, or to buy, as represented by path 572, in which case its status/access is purchased private 573.

Figure 5D:
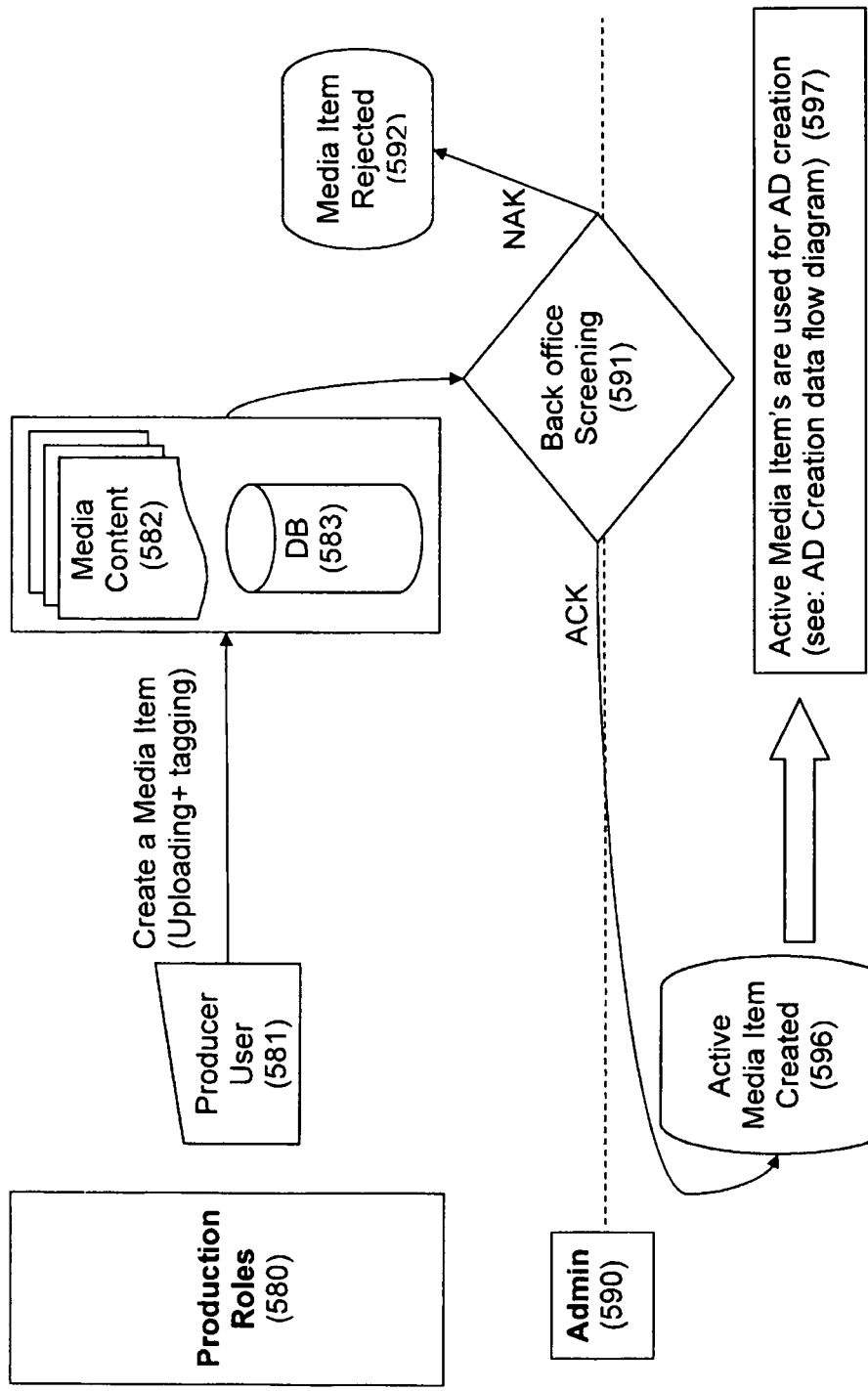
FIG. 5d is a schematic data flow diagram for media item uploading and editing, constructed according to the principles of the present invention.

FIG. 5d is a schematic data flow diagram for media item uploading and editing, constructed according to the principles of the present invention. Production roles 580 include a producer/user 581 creating a media item, which involves uploading and tagging, resulting in the creation of media content 582 and listing in a database 583. Administrative roles 590 include back office screening 591, which results in the administrator either issuing a NAK (not acknowledged) for rejection of the media item 592 or an ACK (acknowledged) for active media item creation 596. Active media items are used for AD creation 597, as described below with reference to FIG. 5e. Media content 582 may be video and/or audio.

Figure 5E:
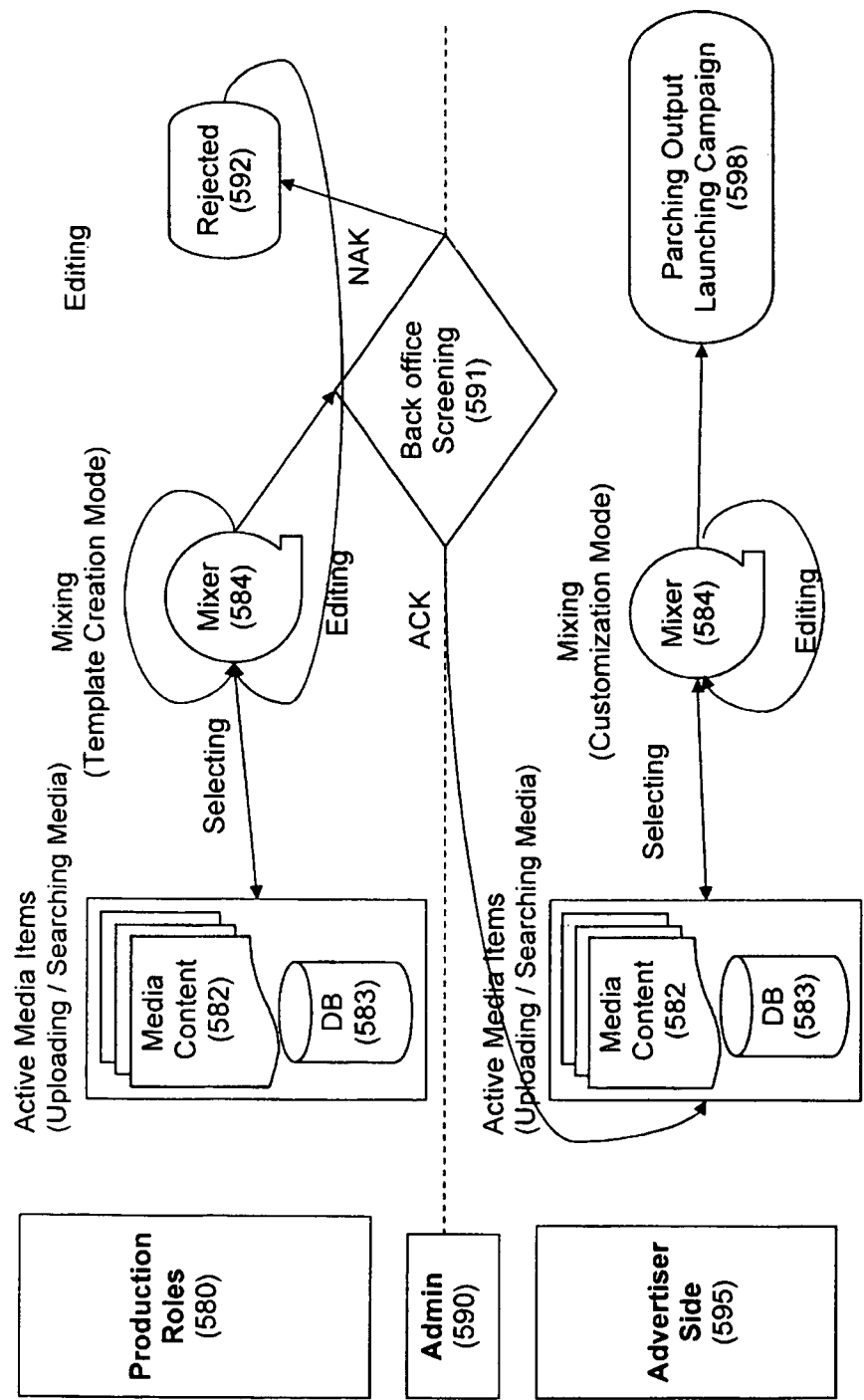
FIG. 5e is a schematic data flow diagram for ad creation, constructed according to the principles of the present invention.

FIG. 5e is a schematic data flow diagram for AD creation, constructed according to the principles of the present invention. Again, production roles 580 include 581 uploading and searching active media items, which are then selected for editing in the mixer 584 in template creation mode. Again, administrative roles 590 include back office screening 591, which results in the administrator either issuing a NAK for rejection 592 of the media item or an ACK for uploading and searching media content 582 listed in database 583. Active media items are again selected for customization in mixer 584 and mixer 584 provides video file parching output and/or materials for launching an advertising campaign 598. Personalization is where the customized ad is personalized by changing one or more of the variable parameters for a multiplicity of ad purposes.

Figure 6:
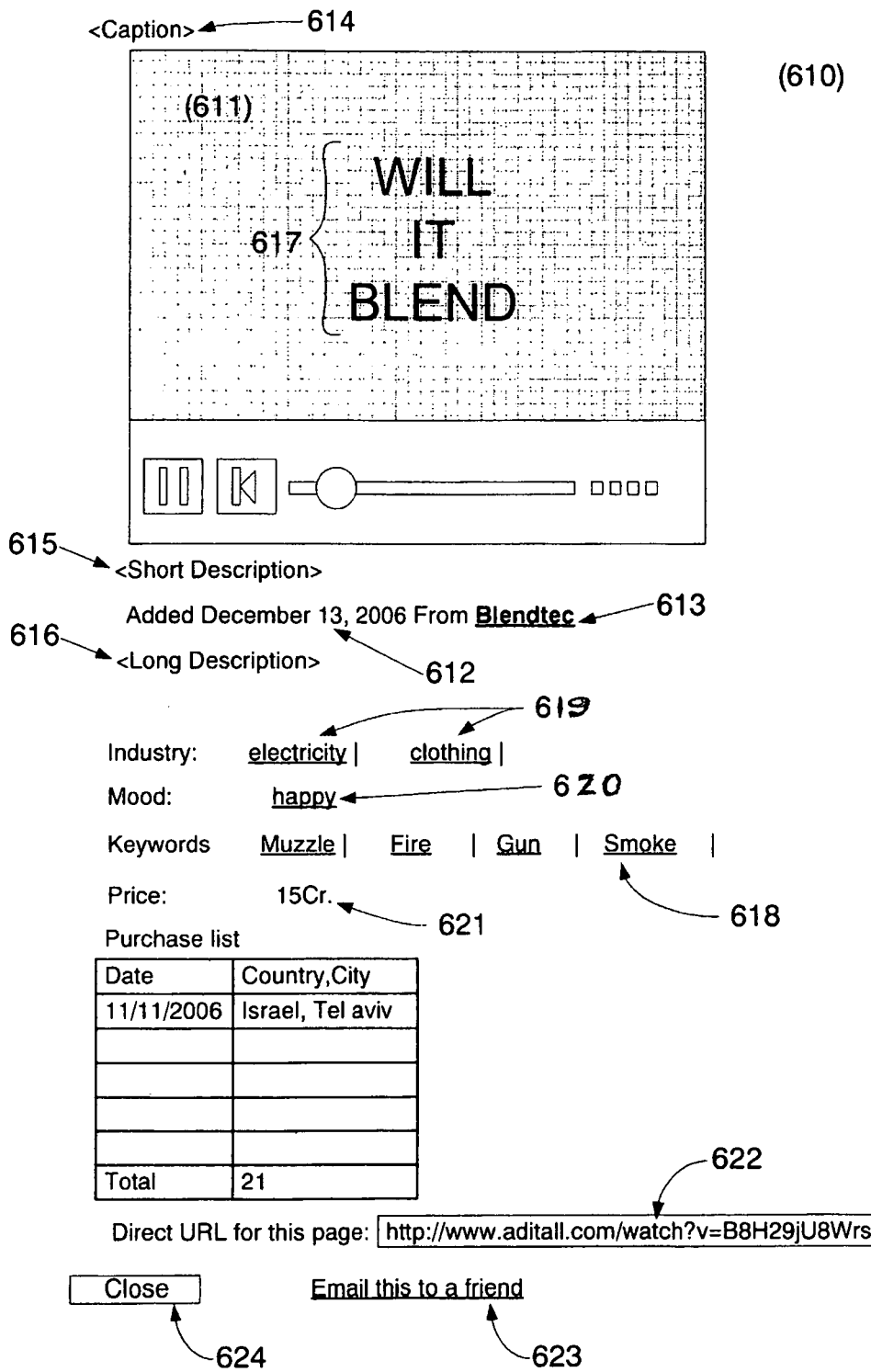
FIG. 6 is a screenshot of the ADit PLAYER function, constructed according to the principles of the present invention.

FIG. 6 is a screenshot of the ADit PLAYER function, constructed according to the principles of the present invention. When the user visits the site he selects any of the following for screen entry: the overall Player screen 611, Creation date 612, advertiser/producer/user 613, Title 614, Summary 615, Detailed Description 616, onscreen Narration text 617, search Keywords 618, Industry 619, Mood 620, Selling Price 621, direct URL link to page 622, "email to a friend" button 623 and Close button 624.

The Community Page Creative Role, as illustrated in Table Ia below has text explaining the community function. Complaints relating to violations of the producer/advertiser's rights and obligations are presented graphically. If the user concurs, he marks the box "AGREE." The UPLOAD function has two formats: 1) Footage upload; and 2) Music upload, achieved by properly clicking on the display screen. The user needs authorization (the access role) to pass over to the community page.

The FOOTAGE creation wizard has:
Stage 1:
Explains the rights of the producer/advertisers.
Signature on the user terms and condition.
Explanation of Model Release agreement upload form for a thorough search.
Browse . . .
Check the automation of file weights and the minimal resolution.
All videos should be 10-60 seconds only.
File upload—the clock running message is parallel to it.
Stage 2: enter the length of the FOOTAGE which is already uploaded:
Caption
Description
Search keywords, at least 10 keywords
(Spell check all fields)
Branches—choose among multiple branches that were created to be made suitable (from a list).
Selling price to the customer should be at a suitable level between an established maximum and minimum. For the professional producer/advertiser there is no maximum limit.
Name of the music producer/advertiser (optionally, chosen from a list of all music producer/advertisers on the site).
There is a check box indicating the user accepts the legal terms of this Website.
MUSIC UPLOAD PAGE
Title
Description
Search keywords, at least 10 keywords
Mood (from a list)
Branches—choose among multiple branches that were created to be made suitable (from a list).
(Spell Check all Fields)
The selling price to the customer should be at a suitable level between an established maximum and minimum. For the professional producer/advertiser there is no maximum limit. An explanation of the rights of the producer/advertisers will be signed per agreement of terms and conditions by the user. Minimally, check that the length is between 10-60 seconds; check the bit rate automatically for the file size and duration. During file upload the clock is running.

MUSIC GALLERY (displayed on the MIXER)

FIG. 7 is a screenshot of the MUSIC GALLERY function, constructed according to the principles of the present invention. MUSIC GALLERY 700 is standalone without a framework in the Website. MUSIC GALLERY 700 is displayed as a modal popup on the MIXER. The favorites 710 and the search results 720 are displayed as shown in FIG. 7

FIG. 8a is an illustration of the PLAYER/MIXER client side control, as it appears on the advertiser interface, constructed according to the principles of the present invention. The MIXER is intended to help Web advertisers to edit film (video) clips and play edited film (video) clips. The module is executed as a FLASH APPLET, which is embedded in an ASP2 page. There are three options for place holders: images, audio or text.

The interface definition layer 810 has the concurrent settings options. The slider 820 and seconds' markings represent changes in time. An item is chosen for editing in the interface definitions by means of the mouse. The Title Overlay button 840 is used to arrange the layers. The player controls for the player 850 are used on the server side. Text, narration and additional data can be edited by the producer/advertiser 860. Text can be modified in content, color, font, size, filler, effects, etc. Fine tune control of a chosen item is done in the frame and caption layer 870.

The module has two controls:

Control 1: The Mixer (Client Side): This control is on the client's side of the interface. The control allows advertisers (clients) to edit video clips through different functions, as described below. At the end of the editing process the details of the edited clip are coded into XML and saved on the server. (XML standard Format is used throughout the development process)

Control 2: Player (Client and Server Side) 850: This control presents the film (video) clip by loading the XML in the standard format (the same XML that was edited in the mixer).

The Mixer/Player module supports two Modes of Action:

Mode 1: Composed-embedded in the system of the present invention; and

Mode 2: Stand Alone (Independent) in this situation the module is not connected to the system of the present invention and is used as an independent Mixer and Player.

In any place the advertiser is asked to upload a file:

The flash will direct him to the HTML page where it sits through command. Interface file upload and saving on the server is implemented in ASP by the system where the module is embedded. At the end of the upload process, the HTML will direct to the Flash through a setVariable. WebServices API 143 (FIG. 2b) will optionally be used for communication between the module and the enveloping system.

Client Side Form and Interface

Description of the Form and Function of the Mixer and Player.

Client Side MIXER

Mixer Receptor and Transmitter:

Mixer receptor: The XML configuration files are in Time Line presentation format which includes: a link to a film (video), presentation of object definitions and more.

Mixer transmitter: The same XML configuration file which saves the final product of the advertiser's work.

Types of Advertisers and Display Authorizations for Mixer

The mixer is used for producer/advertisers and advertisers, and supports Authorizations respectively:

A producer/advertiser—advertiser creates a template (Template Mode Authentication) that will later be used for advertisers.

INTERFACE Layer definitions 810

Shows the definitions of the layer or the object with the click of the mouse on the editing layer.

Wider and Time Markers 820

The slider allows for jumping between different points in the film (video) clip with the help of the mouse. When the slider touches the object, the slider "snaps" to the left or right side of the object according to which side of the object is closest to the slider.

Text, Narration and Other Details 860

Text, Narration and other details can be edited by the producer/advertiser of the template.

Editing Layers

There are Three Editing Layers

Layer 1. Storyboard 830: Graphic Display of the flow of objects of the film (video) (E.g., where the film (video) splits and where a slide begins and ends.)

Layer 2. Title Overlay 840: Font Definitions (Text size, Placement and Timing, etc.)

Layer 3. Sound and Narration 845: this layer incorporates three sound layers:

1) Narration, 2) Music, 3) Original sound from film (video) footage clip, if any.

Layers are chosen by pressing the button that correlates to the layer. When a layer is chosen within editing, the chosen interface is displayed. When an object is pressed, the details of that object are displayed in the interface of the definitions, and it is possible to move it or to change its size by dragging the mouse or by gentle movement of the buttons.

When an object is highlighted (chosen) from the Slide and Title layer, there are moving buttons which change the length and placement with every click of the mouse from a short period of time to longer periods (in order to avoid particularly hard and soft mouse movements).

Storyboard Slide Interface 830

Figure 9A:
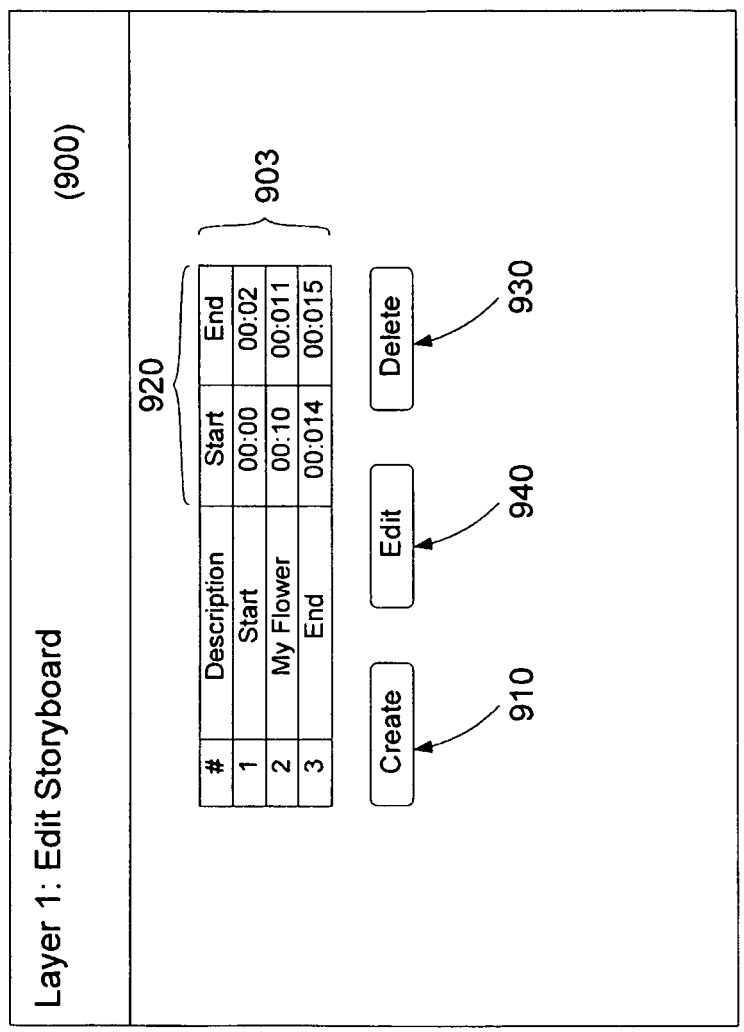
FIG. 9a is a screenshot of the list of slides for the storyboard slide interface and FIG. 9b is a screenshot of the slide designer for the storyboard slide interface, constructed according to the principles of the present invention.
Figure 9B:
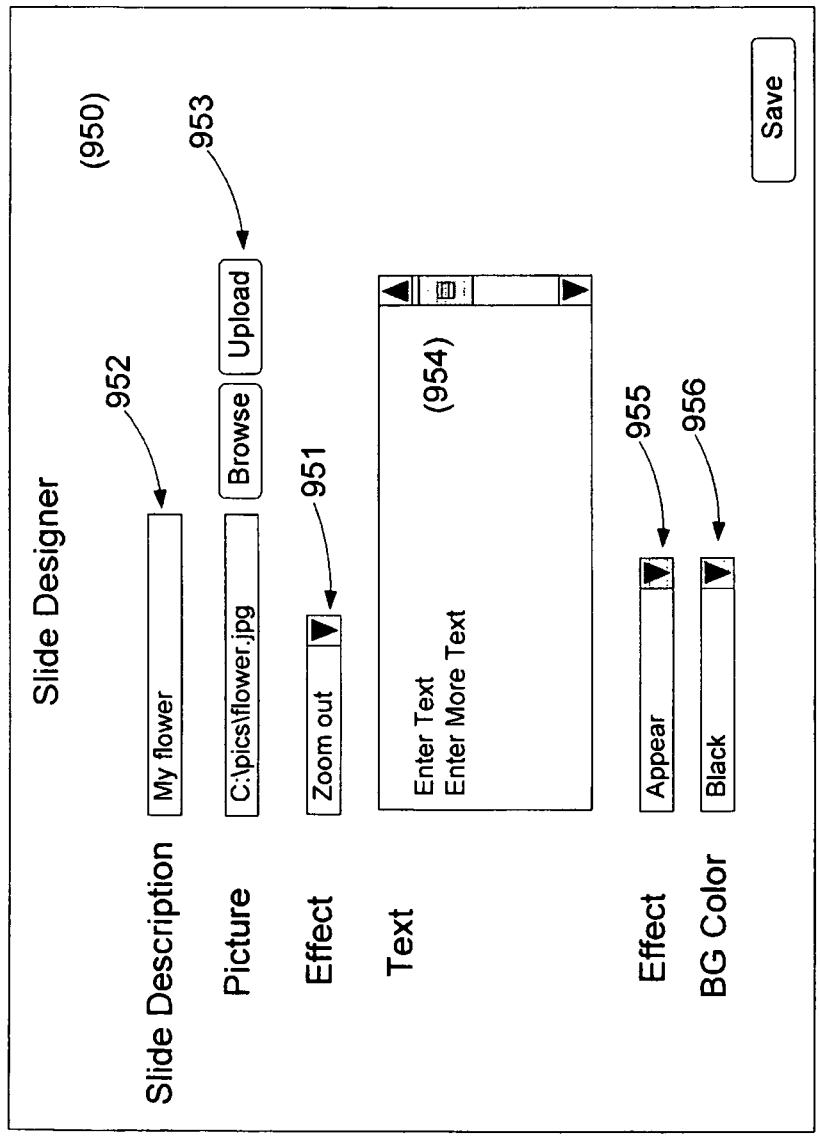

The interface is made up of 2 screens as shown in FIGS. 9a and 9b below.

Figure 8B:
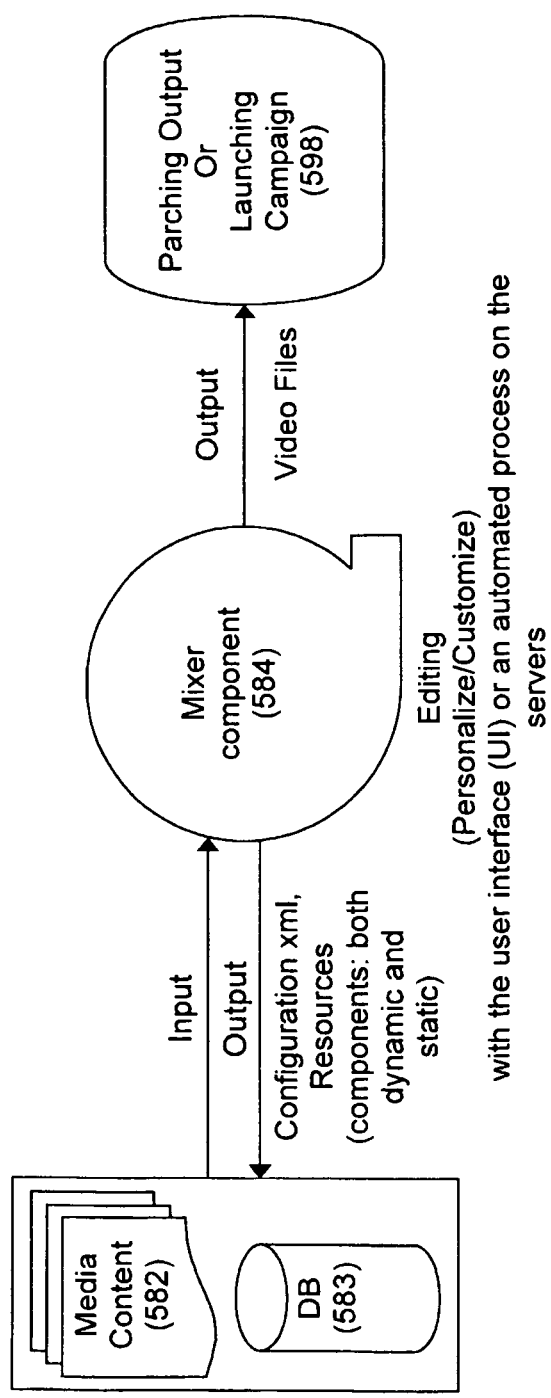
FIG. 8b is an illustration of the PLAYER/MIXER client side control, constructed according to the principles of the present invention.

FIG. 8b is an illustration of the PLAYER/MIXER client side control, constructed according to the principles of the present invention. Media content 582 and corresponding listing in database 583 exchange configuration xml and both dynamic and static resource components with mixer 584. Mixer 584 provides video file parching output and/or materials for launching an advertising campaign 598. Mixer 584 provides editing for both template creation mode and customization mode, as described with reference to FIG. 5e above, using the UI or using an automated process on the servers.

FIG. 9a is a screenshot of the list of slides for the storyboard slide interface 900, constructed according to the principles of the present invention. This screen allows creation 910 of new slides 903, to time their appearance 920, deletion of slides 930 (only by a producer/advertiser) and editing 940 of an existing slide. The list is accessed according to start time. One may check overlapping time codes. The screen has two (2) displays by default.

FIG. 9b is a screenshot of the Slide Designer for the storyboard slide interface, constructed according to the principles of the present invention. The screen allows for two types of advertisers to edit an existing Slide.

Slide Display Effect 951, from a list of effects;
Editing the description of the Slide 952 (the same description appears on the List of Slides screen 953, with reference to FIG. 9*a*);
Uploading a picture 954;
Addition of text 955;
Display Text Effect 956;
Change of background color of the slide 957 (with an option for a "transparent" slide which allows one to see the film (video), "freeze frame" behind)
Depending on time constraints: Option to choose a film (video) that will continue to play in the background of a transparent slide. (Default mode: the image in the film (video) will freeze.)

Figure 10:
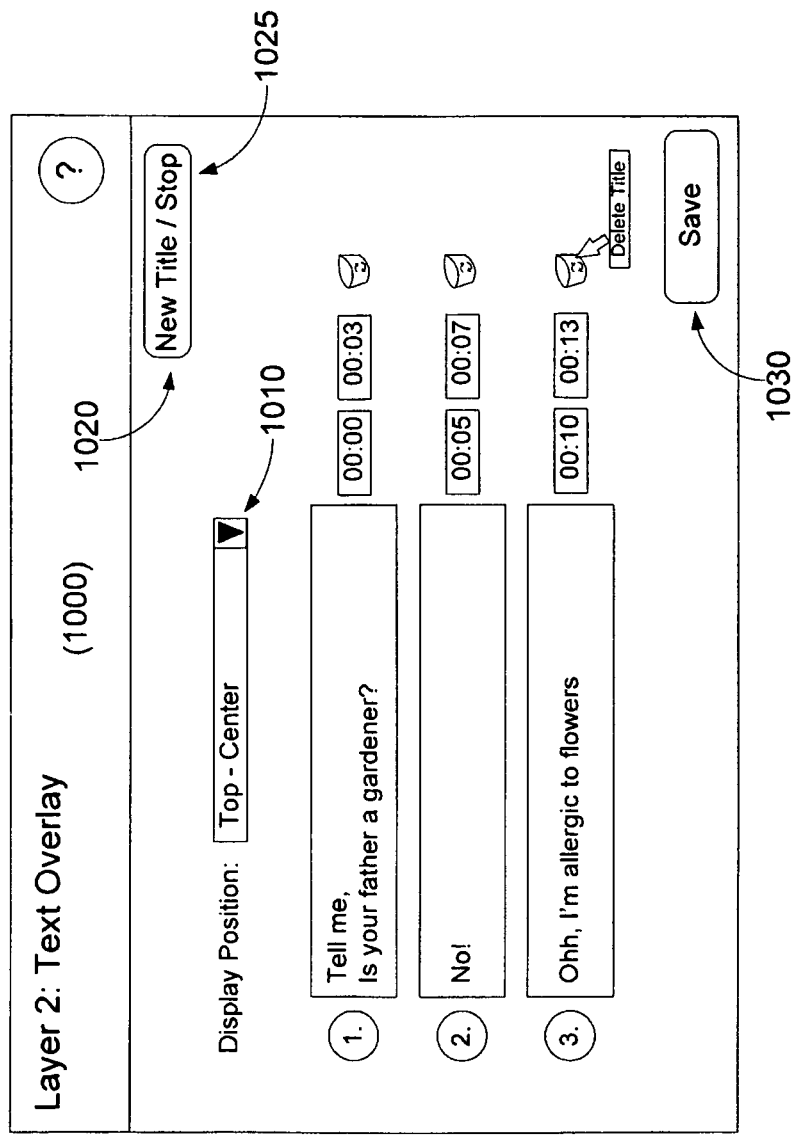
FIG. 10 is a screenshot of the Interface Title Overlay Definitions, constructed according to the principles of the present invention.

FIG. 10 is a screenshot of the Interface Title Overlay Definitions 1000, constructed according to the principles of the present invention. The titles appear as the film (video) is played according to the chosen placement. The "Display Position Choice Box" 1010 defines the placement of the titles within the film or video. The "New Title Button" 1020, which appears when the video is not running, creates a New title. If the video is not being projected the start and end time will be indicated as 00:00 and the stop button will not appear. The "Stop Button" 1025 appears when the video is running and indicates the end time of the present title. The "Save Button" 1030 updates the XML that was formed on the page (or by direct reference to the server).

Figure 11:
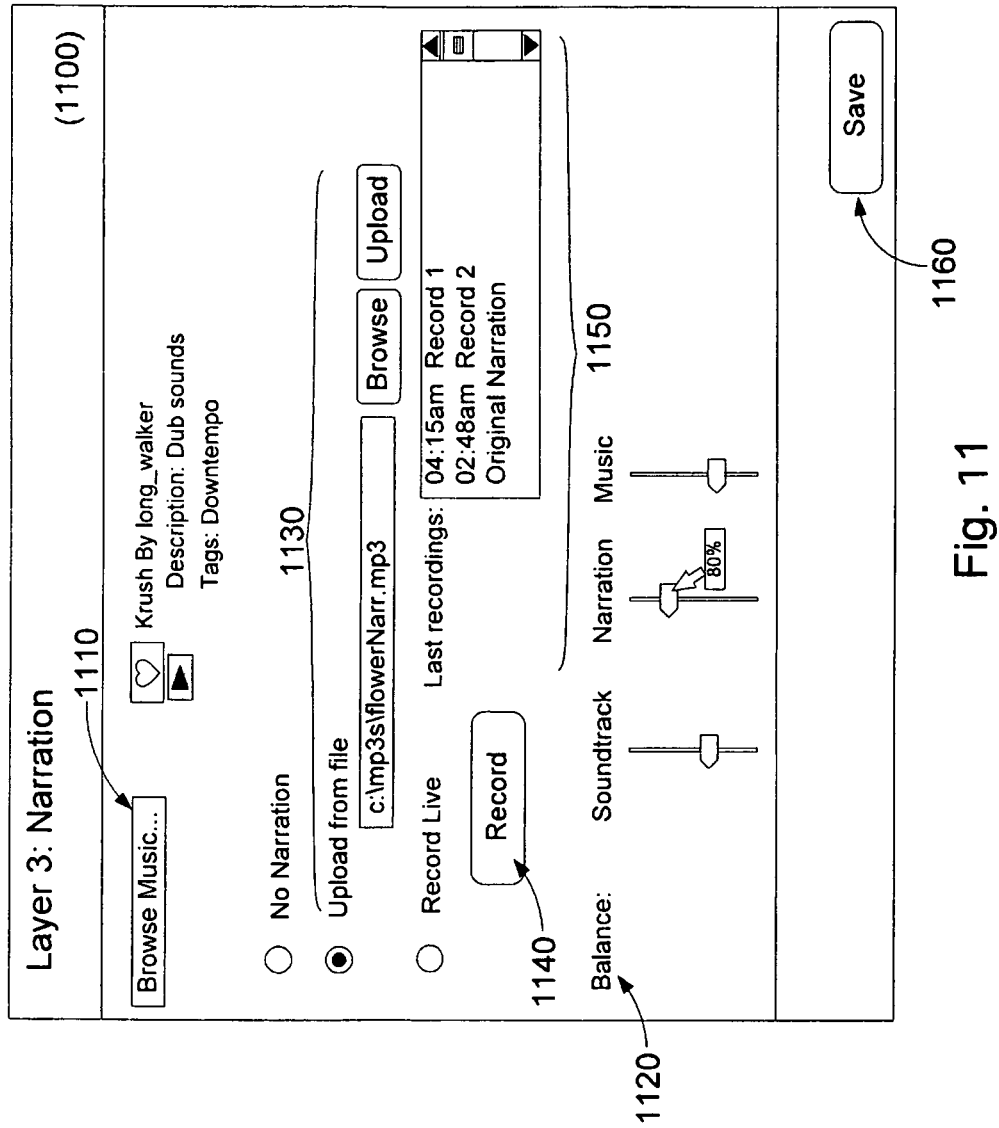
FIG. 11 is a screenshot of the Interface Narration Definitions, constructed according to the principles of the present invention.

FIG. 11 is a screenshot of the Interface Narration Definitions 1100, constructed according to the principles of the present invention.

Definitions of Three Levels of Sound:
1) Narration: Possibility to upload a new narration file or to record narration On-line.
2) Original Recording: (that may have come with the video) During the recording process, this is saved (actually the chosen narration of the producer/advertiser.) and 2 later additional recordings (In the case of a final advertiser and the producer/advertiser, 3 recordings are saved.)
3) Music: Option of picking background music from an assortment of music files that exist on the server. Controls include a Browse Music Button 1110, a Balance Button 1120, an Upload Section 1130, a Record Button 1140, a Last recordings button 1150 and a Save Button 1160.

PLAYER: The PLAYER presents the film (video) clip by loading the XML in the correct format and is used on the server side and customer side simultaneously. The player has control activations that are automatically hidden unless the mouse rolls over or points to the lower part of the player. (There is an option for an external KINPOG.) Table IX below provides details of list of the PLAYER.

The following description of the invention includes tables for summarizing the programming specifications, which are of use to a programmer skilled in the art.

The Website pages are organized according to the 3 domains according to the details shown in Table Ia below.

TABLE Ia

| Roles and subroles | | Description |
| --- | --- | --- |
| Admin | System Admin Master Role | Unlimited access and control System configuration enabled |
| | Multimedia Editor Role (back office) | Media Screening enabled Producer Roles enabled |
| Producer | Footage Role | Footage Creation enabled |
| | VIP Footage Role | Footage Creation enabled and allowed to set any price |
| | Sound Role | Audio Creation enabled |
| | VIP Sound Role | Audio Creation enabled and allowed to set any price |
| | Community Page Creative Role | Template Creation enabled |
| | VIP Creative Role | Template Creation enabled and allowed to set any price |
| Advertiser | — | Template Customization |

Table Ib below provides details of Producer/advertiser's HomePage 320.

TABLE Ib

| Header of Main menu: | | |
| --- | --- | --- |
| Type of Acccess | Result of selecting the Tab Option | Tab Options |
| Public (without login) | Return to producer/advertiser's homepage (appropriate section below) | Home 321 |
| Restricted to authorized users | Menu appears; return to producer/advertiser's homepage, footage/music according to role. | Upload 322 |
| Restricted to authorized user | Return to Account page within the option profile (edited personally) | Account 323 |
| Restricted to authorized users | Total earnings at present | Balance in Dollars |
| Footer | | |
| Access | Result of selecting option | Option |
| public | Return to page of user conditions | Terms |
| public | Return to support page | Service |
| public | Return to contact page | Contact Us |
| public | Return to "About us" page | About Us |
| Description/Depiction | | Section |
| A partial display and user not yet identified | | LOGIN |
| Free text | | Search terms |

TABLE Ib-continued

| | | | |
|---|---|---|---|
| Selection box MOOD | | | window |
| Fixed parameters at the beginning of the search | | | Formats |
| Bestselling Templates (filtered by transaction) | Most Popular | Top Media | and settings |
| FOOTAGES & TEMPLATES according to interface chosen, FLAG ADMIN | Editor's Pick | | |
| FOOTAGES by date filtered by user connection & stats, Public or Private | Recently added My featured media | Menu My media | |
| filtered by user links & stats, Draft | My Drafts | | |
| filtered by user links & stats, pending or rejected | My pending media | | |
| Preferences | My favorites | | |
| News listings sorted by date; News composed in HTML; option to highlight links, etc. in color (may include pictures (e.g., Capture from movie linked to video) | | What's new | |
| Selected questions linked to the page FAQ | | FAQ | |
| Displayed Template credited (selected) | | chosen producer | |
| Video clips & video w/important producer/advertiser given bit-by-bit Archive link | | Producer segment | |
| Listings to links to pages/stories explained with a summary. | | School to advertise | |
| producer/advertisers advertise brands | | ADITALL ™ in action | |

Table II below provides details of the page for Producer/advertiser Search Results 400 as described above for FIG. 4a.

TABLE II

Functions allowed for the item:

| Function | | | | | | | |
|---|---|---|---|---|---|---|---|
| Favorites | ADIT/Mix | Display | Copy | Delete | Edit | User | |
| V | 0 | V | V | V | V | (logged in) | Templates |
| V | 0 | V | X | X | X | Other user | (410) |
| V | V | V | 0 | V | V | (logged in) | Footage |
| V | V | V | 0 | X | X | Other user | (420) |
| V | 0 | V | 0 | V | V | (logged in) | Music |
| V | 0 | V | 0 | X | X | Other user | (430) |

Stage 1:

Table III below provides details of the ADit stage 1 TEMPLATE creation function 510 with respect to FIG. 5a described above.

TABLE III

| Activity | Field |
|---|---|
| Appears when the user is offline (before LOGIN) return to stage 2 | warning message NEXT button 517 |
| Appears only when user logs in | |

Stage 2:

Table IV below provides details of the ADit stage 2 MIXER function 550 with respect to FIG. 5b described above.

TABLE IV

AD detailed screen.

| Format | Field |
|---|---|
| Caption (free text) | Title 551 |
| Date (free text) | Summary 552 |

TABLE IV-continued

AD detailed screen.

| Format | Field |
|---|---|
| Detailed description (free text) | Description 553 |
| Search keywords (free text) | Keywords 554 |
| Within a list of industries (large selection) | Industry 555 |
| Within a list of MOOD's (large selection) | Mood 556 |
| Sale price to customer, if the price level is suitable between maximum and minimum that we fix. For the professional producer/advertiser there is no maximum. | Price 557 |
| End and save as draft. Save in "My Media." | SAVE button 558 |
| End without sending to editor. It is necessary to view and edit the work of the user only. | |
| Finish and send to the editor. Send to the editor for approval | SAVE & RUN button 559 |

Table V below provides details of the ADit PLAYER function 610 with respect to FIG. 6 described above. The screen shows object as requested (footage, music, template or AD).

TABLE V

| Format | Field |
|---|---|
| Flash field; shows characterization of the mixer/player; shows video and activity buttons. A music object is agreed upon and music player opens. | Player 611 |
| Object creation date | Creation date 612 |
| Name of producer/advertiser (link to search results by user) | advertiser/producer/user 613 |
| Caption (text) | Title 614 |
| Short Description (text) | Summary 615 |
| Detailed description (text) | Description 616 |
| Narration text (text). Text stored & parsed in the mixer, displayed in the TEMPLATE wizard | Narration text 617 |
| Search keywords (links at start of search to keyword parameters) | Key words 618 |
| Within industry list (linked at the beginning of the search to the keyword parameters) | Industry 619 |
| Within list of MOOD's, linked at start of search to keyword parameters | Mood 620 |

TABLE V-continued

| Format | Field |
| --- | --- |
| Selling price to customer | Price 621 |
| Displays URL directly to the producer/advertiser (text) | Direct link 622 |
| Link to send to a friend | Email this 623 |
| Close the window | Close 624 |

Table VI below provides details of the list of slides as described with reference to FIG. 9a above, for the storyboard slide interface 1000 as described with reference to FIG. 10 above.

TABLE VI

| Controls | Actions | Advertiser type | |
| --- | --- | --- | --- |
| Create Button 910 | Display | Template Maker | Makes New Slides 903 |
| Edit Button 940 | Display | Everybody | Transitions for the Editor (to the other interface) |
| Delete Button 930 | Display | Template Maker | Deletes slides |
| Start Page 920 | Editing | Template Maker | Begins Time Code Display |
| End Page 920 | Editing | Template Maker | Ends Time Code Display |

Table VII below provides details of list of Interface Title Overlay Definitions as described with reference to FIG. 10 above.

TABLE VII

| Control | |
| --- | --- |
| Display Position Choice Box 1010 | Defines the placement of the titles within the film (video). |
| New Title Button 1020 (appears when film (video) not running) | Creates a New title. If the film (video) is not projected the start and end time will be indicated as 00:00 and the stop button will not appear. |
| Stop Button 1025 (appears when film running) | Indicates the end time of the present title, This button only appears when the film is running. |
| Save Button 1030 | Updates the XML that was formed on the page or by direct reference to the server. |

Table VIII below provides details of Interface Narration Definitions 1100, as described above with reference to FIG. 11.

TABLE VIII

| Control | |
| --- | --- |
| Browse Music Button 1110 | Opens ASP Window which allows the advertiser to search and find music- includes a No Music Option. |
| Balance 1120 | Defines the relative volume between layers |
| Upload Section 1130 | Uploads Narration |
| Record 1140 | Records Narration. Allows for adding a record control from an external machine if one is found. |
| Last recordings 1150 | Choice of last recorded narrations or the Producer/advertisers narration |
| Save Button 1160 | Updates the XML that has amassed on the page or directly references the server |

Table IX below provides details of the PLAYER functions.

TABLE IX

| Controls | |
| --- | --- |
| Play/Pause | One button that alternately plays and freezes the film (video) strip |
| Rewind | Moves to the beginning of the film (video) |
| Forward | Moves to the end of the film (video) |
| Mute | Silences the film (video's audio) |

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A Web-based system for accessing development components, which include an online video clip library and an online music clip library, and enabling online production of custom-integrated media products, said system comprising at least one computer server connected to a computer network, said server including:

an upload engine capable of receiving over the computer network a plurality of video and music clips from a plurality of content provider users;

a storage engine capable of storing the uploaded plurality of video and music clips provided by said plurality of content provider users in a database and media content storage devices as libraries;

a search engine capable of indexing the database and media content storage devices that store the libraries of uploaded video and music clips;

a user interface engine capable of providing over the computer network to a plurality of producer users interactive Web formatting screens allowing said producer users to select from said libraries a plurality of video and music clips from among any of the video and music clips uploaded by said plurality of content provider users; and a mixer module capable of allowing said producer users to edit and play said selected video and music clips, wherein said mixer module supports mixing together a plurality of said uploaded video and music clips, such that producer users are able to self-produce video advertisement templates each comprising static content and at least one placeholder, said mixer module further capable of allowing advertiser users to customize said video advertisement templates by uploading a list, such that advertiser users are able to automatically self-produce a set of different customized video advertisements based on an advertisement template, in which the at least one placeholder for each customized video advertisement contains a different item from the list, wherein said mixer module is capable of arranging said video advertisement templates and customized video advertisements as respective XML files on a server, said XML files being accessible by a plurality of users using respective browser applications, such that upon updating an XML file representing a video advertisement template or a customized video advertisement, the updated video advertisement template or customized video advertisement is made accessible to users accessing the updated XML file;

said system further comprising a Web application for encoding and formatting video advertisements in particular formats.

2. The system of claim 1 further comprising outside WebServices accessible via the Internet by said users utilizing said system for custom-integrating, encoding and formatting said selected uploaded video and music clips.

3. The system of claim 1, wherein said mixer module supports a variety of inputs and outputs.

4. The system of claim 1, wherein said media products are pre-roll ads.

5. The system of claim 1, wherein said media products are 10 to 60 second ads.

6. The system of claim 1, wherein said media products are ads longer than 9 seconds.

7. The system of claim 1, wherein said media products are transitional ads.

8. The system of claim 1, wherein said media products are banner ads.

9. The system of claim 1, wherein said media products are television ads.

10. The system of claim 1, wherein said media products are cellular ads.

11. The system of claim 1, wherein said media products are movies shorter than 10 minutes.

12. The system of claim 1, wherein said media products are movies longer than 10 minutes.

13. The system of claim 1, wherein said media products are personalized email greeting cards.

14. The system of claim 2, wherein said outside WebServices are in streaming format.

15. The system of claim 2, wherein said streaming outside WebServices also host the video clips.

16. The system of claim 1, wherein said Web-based system is further capable of accessing outside servers for providing given services.

17. The system of claim 2, wherein said outside WebServices comprise at least one of encoding, storing and streaming the video clips.

18. The system of claim 1, wherein said mixer module is embedded in a .net ASP2/3 page.

19. The system of claim 2, wherein said outside WebServices host the clips.

20. The system of claim 2, wherein said outside WebServices stream the clips.

21. The system of claim 1, further comprising:
a purchase module capable of allowing said advertiser users to purchase said customized video advertisements; and
a revenue-sharing module capable of distributing revenue among content provider users and producer users associated with the video advertisement template used in said customized video advertisements.

22. A Web-based method for accessing development components, which include an online video clip library and an online music clip library, and enabling online production of custom-integrated media products, said method comprising:
receiving over a network a plurality of video and music clips from a plurality of content provider users;
storing the plurality of video and music clips provided by said plurality of content provider users in a database and media content storage devices as libraries;
indexing the database and media content storage devices that store the libraries of uploaded video and music clips;
providing a plurality of producer users with interactive Web formatting screens, said Web formatting screens capable of allowing said producer users to select among said uploaded video and music clips;
providing said plurality of producer users with an online mixer module, said mixer module capable of editing, mixing together, and playing said selected uploaded video and music clips, to thereby create video advertisement templates each comprising a static component and at least one placeholder, wherein said mixer module is further capable of allowing advertiser users to customize said video advertisement templates by uploading a list, such that advertiser users are able to automatically self-produce a set of different customized video advertisements based on an advertisement template, in which the at least one placeholder for each customized video advertisement contains a different item from the list, wherein said mixer module is further capable of arranging said video advertisement templates and customized video advertisements as respective XML files on a server, said XML files being accessible by a plurality of users using respective browser applications, such that upon updating an XML file representing a video advertisement template or a customized video advertisement, the updated video advertisement template or customized video advertisement is made accessible to users accessing the updated XML file and
encoding and formatting video advertisements in particular formats.

23. The method of claim 22, further comprising allowing advertising users to purchase said customized advertisement videos, and automatically distributing revenue among content provider users and producer users associated with the video advertisement template used in said customized video advertisements.

24. The method of claim 22 further comprising accessing commercial libraries of video clips and other raw material.

25. The method of claim 22 further comprising providing outside WebServices accessible via the Internet by said users utilizing said Web application for custom-integrating, encoding and formatting said selected video and music clips.

26. The method of claim 22, further comprising publishing the ad and sending it to another Website.

27. The method of claim 22, further comprising publishing the ad through a Web advertising service at various times and in various locations for a price which said advertiser establishes to develop a marketing campaign.

28. The method of claim 22, further comprising connecting with a Wizard to create an online broadcast advertising campaign.

29. The method of claim 22, wherein said mixer module is further capable of taking various sources of media content and integrating them in the video template.

30. The method of claim 22, further comprising automatically personalizing a different copy of said advertisement for each person targeted to receive the ad, respectively.

31. The method of claim 22, wherein said personalizing comprises personalizing individual fields in said video advertisement template to match fields in a the list.

32. The method of claim 23, wherein said allowing advertising users to purchase said customized advertisement videos comprises providing pricing options based on at least one use parameter, said use parameter selected from the group consisting of: exclusive and non-exclusive use of said video clip, territorial use and industry-wide use within one or more business segments and one or more time periods.

33. The method of claim 22, further comprising providing users with a direct URL link to a page linking to the XML file representing the video advertisement template or customized video advertisement.

34. The method of claim 22, further comprising upon selection by a user, causing an email to be sent, said email including a direct URL link to a page linking to the XML file representing the video advertisement template or customized video advertisement.

* * * * *